United States Patent
Norieda et al.

(10) Patent No.: US 12,237,937 B2
(45) Date of Patent: Feb. 25, 2025

(54) SERVER DEVICE, CONFERENCE ASSISTANCE SYSTEM, AND CONFERENCE ASSISTANCE METHOD

(71) Applicant: NEC Corporation, Tokyo (JP)

(72) Inventors: Shin Norieda, Tokyo (JP); Kenta Fukuoka, Tokyo (JP); Masashi Yoneda, Tokyo (JP); Shogo Akasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/797,499

(22) PCT Filed: Feb. 27, 2020

(86) PCT No.: PCT/JP2020/007890
§ 371 (c)(1),
(2) Date: Aug. 4, 2022

(87) PCT Pub. No.: WO2021/171450
PCT Pub. Date: Sep. 2, 2021

(65) Prior Publication Data
US 2023/0048703 A1    Feb. 16, 2023

(51) Int. Cl.
*H04L 12/18*    (2006.01)
*G06V 40/16*    (2022.01)

(52) U.S. Cl.
CPC ........ *H04L 12/1822* (2013.01); *G06V 40/172* (2022.01)

(58) Field of Classification Search
CPC .......................... H04L 12/1822; G06V 40/172
See application file for complete search history.

(56) References Cited

U.S. PATENT DOCUMENTS

| | | | | |
|---|---|---|---|---|
| 5,852,807 A | * | 12/1998 | Skarbo ................. | G06Q 10/10 375/E7.017 |
| 2008/0088698 A1 | * | 4/2008 | Patel ..................... | H04N 7/15 348/E7.083 |
| 2010/0085415 A1 | | 4/2010 | Rahman | |

(Continued)

FOREIGN PATENT DOCUMENTS

| | | |
|---|---|---|
| JP | H06-121310 A | 4/1994 |
| JP | 2003-006131 A | 1/2003 |

(Continued)

OTHER PUBLICATIONS

International Search Report for PCT Application No. PCT/JP2020/007890, mailed on Jun. 9, 2020.

(Continued)

*Primary Examiner* — Raqiul A Choudhury

(57) ABSTRACT

Provided is a server device with which a participant in a conference can easily acquire information pertaining to another participant. The server device is provided with an acquisition unit and an information provision unit. The acquisition unit acquires a profile of each of a plurality of users using a conference assistance system. The information provision unit provides, to a first participant participating in a conference from among a plurality of users, a profile pertaining to a second participant participating in the same conference as that in which the first participant is participating.

12 Claims, 27 Drawing Sheets

(56) References Cited

U.S. PATENT DOCUMENTS

| | | | | |
|---|---|---|---|---|
| 2012/0206561 A1* | 8/2012 | Huang | ............... | H04N 7/15 |
| | | | | 348/14.09 |
| 2013/0155169 A1* | 6/2013 | Hoover | ............ | H04N 7/157 |
| | | | | 348/E7.083 |
| 2014/0099075 A1* | 4/2014 | Li | ..................... | H04N 7/155 |
| | | | | 386/241 |
| 2018/0232566 A1* | 8/2018 | Griffin | ............ | G06V 40/166 |
| 2019/0095164 A1* | 3/2019 | Yamaura | ............ | G10L 15/26 |
| 2019/0306568 A1* | 10/2019 | Wu | ................... | G06V 40/70 |
| 2020/0412780 A1* | 12/2020 | Devendran | ........ | G06N 20/00 |

FOREIGN PATENT DOCUMENTS

| | | |
|---|---|---|
| JP | 2003-339033 A | 11/2003 |
| JP | 2009-086900 A | 4/2009 |
| JP | 2010-028715 A | 2/2010 |
| JP | 2010-098731 A | 4/2010 |
| JP | 2011-061314 A | 3/2011 |
| JP | 2013-533526 A | 8/2013 |
| JP | 2018-032294 A | 3/2018 |
| JP | 2018-036946 A | 3/2018 |
| JP | 2019-061594 A | 4/2019 |

OTHER PUBLICATIONS

English translation of Written opinion for PCT Application No. PCT/JP2020/007890, mailed on Jun. 9, 2020.
JP Office Action for JP Application No. 2023-009261, mailed on Jan. 30, 2024 with English Translation.
JP Office Action for JP Application No. 2023-009261, mailed on Apr. 2, 2024 with English Translation.
JP Official Communication for JP Application No. 2023-009261, mailed on Sep. 10, 2024 with English Translation.

* cited by examiner

Fig.6

| SYSTEM USER REGISTRATION |

NAME [        ]

EMPLOYEE NUMBER [        ]

WORKPLACE [        ]

AFFILIATION DEPARTMENT [        ]

TELEPHONE NUMBER [        ]

E-mail [        ]

PLEASE REGISTER FACE IMAGE FILE

[ SELECTION OF FILE ]

PLEASE SELECT NEW REGISTRATION OR UPDATING OF REGISTERED CONTENT

[ NEW REGISTRATION ]   [ UPDATE ]

[ TRANSMIT ]

Fig.7

USER DATABASE

| USER ID | FEATURE AMOUNT | FACE IMAGE | NAME | EMPLOYEE NUMBER | WORKPLACE | AFFILIATION DEPARTMENT | TELEPHONE NUMBER | ... |
|---|---|---|---|---|---|---|---|---|
| ID01 | FV1 | F1 | AAA | 12345X1 | X11 | X21 | X31 | ... |
| ID02 | FV2 | F2 | BBB | 12345X2 | X12 | X22 | X32 | ... |
| ID03 | FV3 | F3 | CCC | 12345X3 | X13 | X23 | X33 | ... |
| ID04 | FV4 | F4 | DDD | 12345X4 | X14 | X24 | X34 | ... |
| ... | ... | ... | ... | ... | ... | ... | ... | ... |

Fig.8

PARTICIPANT LIST

| PARTICIPANT ID | CONFERENCE ROOM TERMINAL ID | BASE |
|---|---|---|
| ID01 | 10-1 | BASE A |
| ID02 | 10-4 | BASE A |
| ID03 | 10-5 | BASE B |
| ID04 | 10-8 | BASE B |

Fig.13

```
SYSTEM USER REGISTRATION

NAME            [                    ]

AFFILIATION     [                    ]
ORGANIZATION 1

AFFILIATION     [                    ]
ORGANIZATION 2

AFFILIATION     [                    ]
DEPARTMENT 1

AFFILIATION     [                    ]
DEPARTMENT 2

⋮

PLEASE REGISTER FACE IMAGE FILE

[ SELECTION OF FILE ]

PLEASE SELECT NEW REGISTRATION OR
UPDATING OF REGISTERED CONTENT

[   NEW    ]      [ UPDATE ]
    [REGISTRATION]

[   TRANSMIT   ]
```

Fig.14

| USER ID | FEATURE AMOUNT | FACE IMAGE | NAME | AFFILIATION ORGANIZATION 1 | AFFILIATION ORGANIZATION 2 | AFFILIATION DEPARTMENT 1 | AFFILIATION DEPARTMENT 2 | ... |
|---|---|---|---|---|---|---|---|---|
| ID01 | FV1 | F1 | AAA | Z11 | Z12 | X21 | ZX11 | ... |
| ID02 | FV2 | F2 | BBB | Z21 | — | X22 | — | ... |
| ID03 | FV3 | F3 | CCC | Z11 | — | X23 | — | ... |
| ID04 | FV4 | F4 | DDD | Z11 | ... | X24 | ... | ... |
| ... | ... | ... | ... | ... | ... | ... | ... | ... |

USER DATABASE

Fig.20

| SPEECH ID | NAME | FACE IMAGE | SPEECH CONTENT | ... |
|---|---|---|---|---|

SPEAKER INFORMATION

Fig.21

| SPEECH TIME | SPEAKER ID | SPEECH ID | SPEECH CONTENT |
|---|---|---|---|
| 13:01:01 | ID01 | S01 | TEXT01 |
| 13:01:02 | ID01 | S02 | TEXT02 |
| 13:01:03 | ID03 | S03 | TEXT03 |
| 13:01:04 | ID03 | S04 | TEXT04 |
| ... | ... | ... | ... |

Fig.22

PARTICIPANT'S VIEW DATABASE

| SPEECH TIME | SPEAKER ID | SPEECH ID | SPEECH CONTENT | OPINION OF EACH PARTICIPANT ID ||||
|---|---|---|---|---|---|---|---|
| | | | | ID01 | ID02 | ID03 | ID04 |
| 13:01:01 | ID01 | S01 | TEXT01 | | 1 | 1 | |
| 13:01:02 | ID01 | S02 | TEXT02 | 1 | | | |
| 13:01:03 | ID03 | S03 | TEXT03 | 1 | 1 | | |
| 13:01:04 | ID03 | S04 | TEXT04 | | | | 1 |
| ... | ... | ... | ... | | | | 1 |

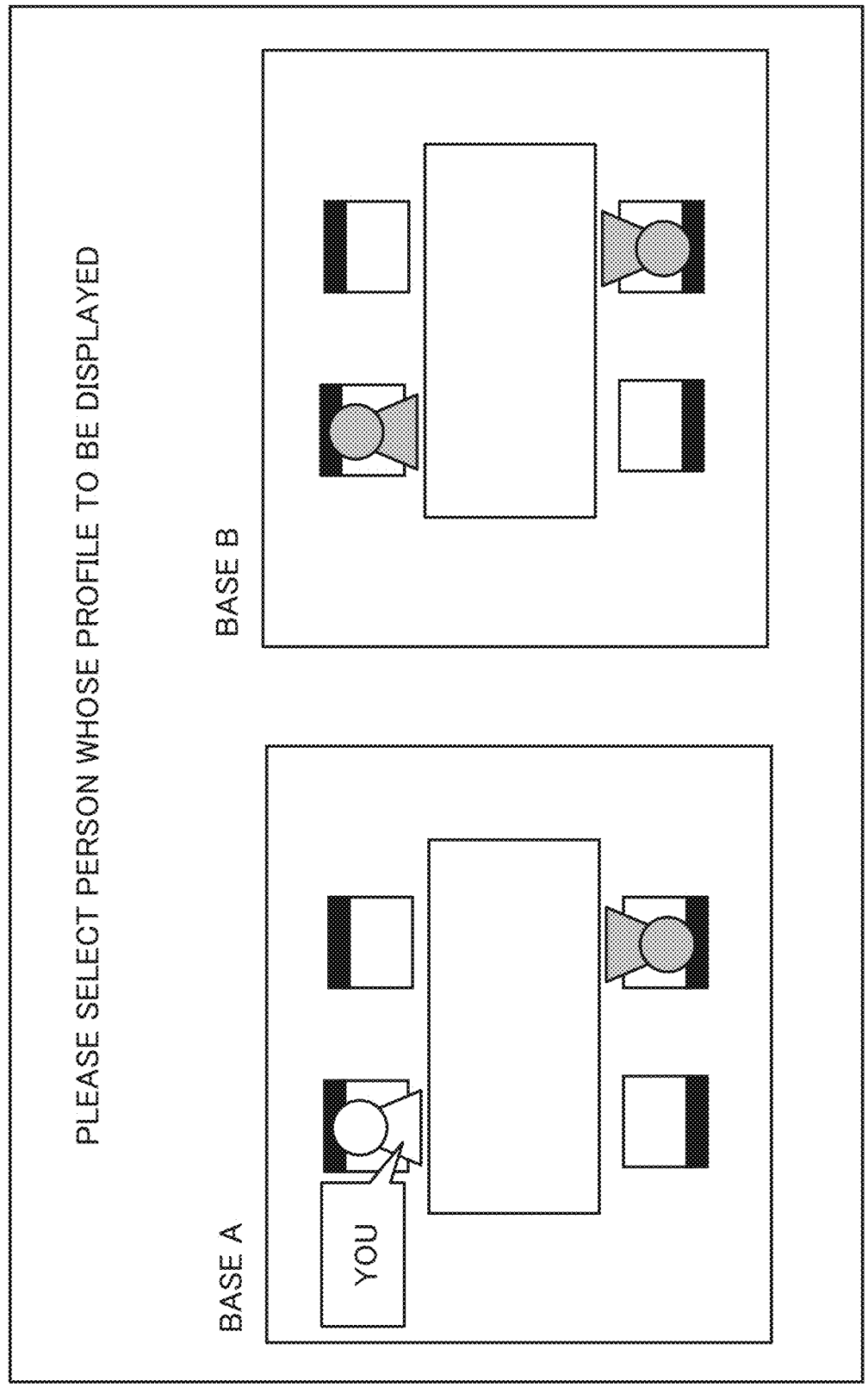

SERVER DEVICE, CONFERENCE ASSISTANCE SYSTEM, AND CONFERENCE ASSISTANCE METHOD

This application is a National Stage Entry of PCT/JP2020/007890 filed on Feb. 27, 2020, the contents of all of which are incorporated herein by reference, in their entirety.

TECHNICAL FIELD

The present invention relates to a server device, a conference assistance system, a conference assistance method, and a program.

BACKGROUND ART

In recent years, with advances of network technologies and information processing technologies, video conferences in which conference rooms at remote places are connected via networks have become active.

For example, PTL 1 describes that content of a conference is capitalized to make a conference operation efficient. A conference assistance system disclosed in PTL 1 includes an image recognition unit.

The image recognition unit recognizes an image related to each participant from video data acquired by a video conference device using an image recognition technology. Further, the system includes a voice recognition unit. The voice recognition unit acquires voice data of each attendee acquired by the video conference device and compares the voice data with feature information of the voice of each attendee registered in advance. Further, the voice recognition unit identifies a speaker of each speech act in the voice data on the basis of information regarding movement of each attendee. Further, the conference assistance system includes a timeline management unit that outputs voice data of each attendee acquired by the voice recognition unit in time-series speeches as a timeline.

CITATION LIST

Patent Literature

[PTL 1] JP 2019-061594 A

SUMMARY OF INVENTION

Technical Problem

As described above, so-called video conferences are actively performed. In a normal conference, when participants who meet for the first time attends the conference, the participants exchange their business cards. The participants can obtain information regarding people from the acquired business cards.

However, business cards cannot be exchanged in a video conference performed by connecting remote places via a network, and the participants cannot obtain information regarding people whom they meet for the first time. Although a simple self-introduction or the like may be performed at the beginning of the conference, the participants only know the names or the like of the relevant people. However, in the conference, the positions of other participants, particularly, the positions and the like of business partners are important information for proceeding with the conference. Not only in video conferences but also at in-house meetings, there are many companies and the like in which business cards are not exchanged. Even in such cases, a problem may arise in that it is difficult to obtain information necessary for a conference.

A main objective of the present invention is to provide a server device, a conference assistance system, a conference assistance method, and a program contributing to easy acquisition of information regarding other participants of a conference by each participant.

Solution to Problem

According to a first aspect of the present invention, there is provided a server device including: an acquisition unit configured to acquire a profile of each of a plurality of users using a conference assistance system; and an information provision unit configured to provide a first participant participating in a conference among the plurality of users with a profile related to a second participant participating in the same conference as the conference in which the first participant participates.

According to a second aspect of the present invention, there is provided a conference assistance system including: a first terminal used by a first participant participating in a conference; a second terminal used by a second participant participating in the same conference as the conference in which the first participant participates; and a server device. The server device includes an acquisition unit that acquires a profile of each of a plurality of users who uses the system and an information provision unit that provides a profile related to the second participant to the first terminal.

According to a third aspect of the present invention, there is provided a conference assistance method including: in a server device, acquiring a profile of each of a plurality of users using a conference assistance system; and providing a first participant participating in a conference among the plurality of users with a profile related to a second participant participating in the same conference as the conference in which the first participant participates.

According to a fourth aspect of the present invention, there is provided a computer-readable recording medium that stores a program causing a computer mounted on a server device to execute: a process of acquiring a profile of each of a plurality of users using a conference assistance system; and a process of providing a first participant participating in a conference among the plurality of users with a profile related to a second participant participating in the same conference as the conference in which the first participant participates.

Advantageous Effects of Invention

According to each aspect of the present invention, there is provided a server device, a conference assistance system, a conference assistance method, and a program contributing to easy acquisition of information regarding other participants of a conference by each participant. The advantageous effects of the present invention are not limited to the above advantageous effects. According to the present invention, other effects may be exhibited instead of or in addition to the advantageous effects.

BRIEF DESCRIPTION OF DRAWINGS

FIG. 6 is a diagram illustrating an operation of a user information acquisition unit according to the first example embodiment.

FIG. 7 is a diagram illustrating an example of a user database according to the first example embodiment.

FIG. 8 is a diagram illustrating an example of a participant list according to the first example embodiment.

FIG. 13 is a diagram illustrating an operation of a user information acquisition unit according to a second example embodiment.

FIG. 14 is a diagram illustrating an example of a user database according to the second example embodiment.

FIG. 20 is a diagram illustrating an example of speaker information according to the third example embodiment.

FIG. 21 is a diagram illustrating an operation of a participant's opinion management unit according to the third example embodiment.

FIG. 22 is a diagram illustrating an example of a participant's view database according to the third example embodiment.

FIG. 27 is a diagram illustrating an operation of a conference room terminal according to a modified example of the present disclosure.

EXAMPLE EMBODIMENT

Figure 1:
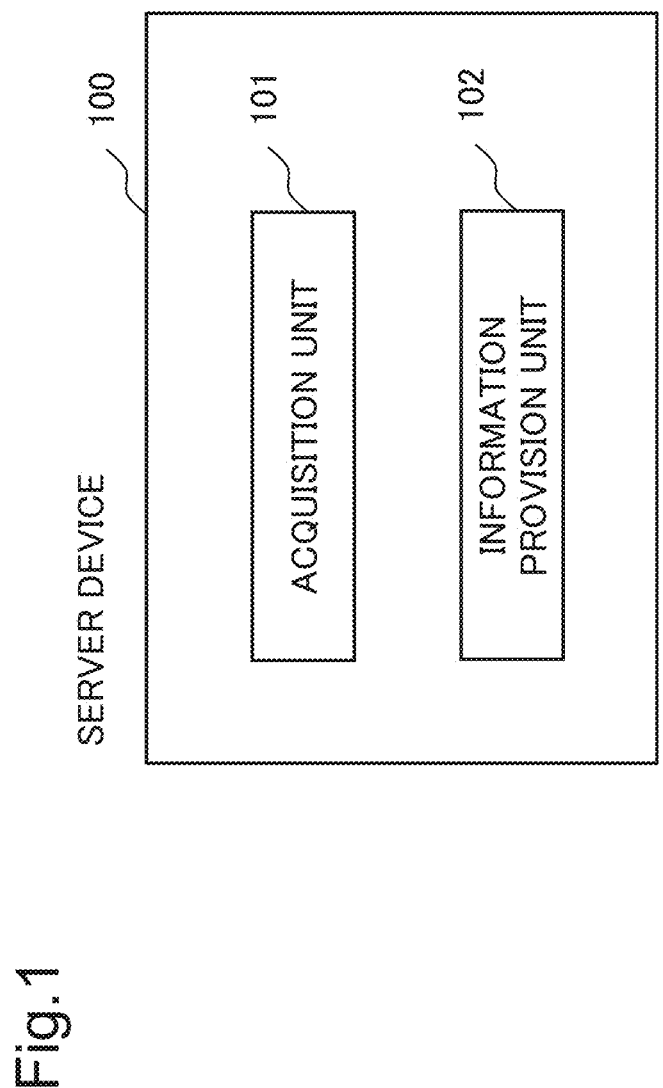
FIG. 1 is a diagram illustrating an overview of an example embodiment.

First, an overview of an example embodiment will be described. The reference numerals in the drawings attached to this overview are attached to each element for convenience as an example for assisting understanding, and the description of the overview is not intended to be limiting in any way. Unless otherwise particularly stated, the blocks described in each drawing represent not a configuration of a hardware unit but a configuration of a functional unit. Connection lines between blocks in each drawing include both bidirectional and unidirectional lines. A unidirectional arrow schematically indicates a flow of a main signal (data) and does not exclude bidirectionality. In the present specification and the drawings, elements that can be similarly described are denoted by the same reference numerals, and redundant description may be omitted.

A server device 100 according to an example embodiment includes an acquisition unit 101 and an information provision unit 102 (see FIG. 1). The acquisition unit 101 acquires a profile of each of a plurality of users using a conference assistance system. The information provision unit 102 provides a first participant participating in a conference from among the plurality of users with a profile of a second participant participating in the same conference as the conference in which the first participant participates.

The server device 100 acquires the profile of the user in advance and registers the profile, for example, in a database. For example, when provision of information regarding other participants is requested from a participant, the server device 100 reads necessary information from the database and provides the information to the participant making the request to provide the information. As a result, even when the participants meet for the first time, the participants can easily acquire information regarding the other participants.

Hereinafter, specific example embodiments will be described in more detail with reference to the drawings.

First Example Embodiment

A first example embodiment will be described in more detail with reference to the drawings.

Figure 2:
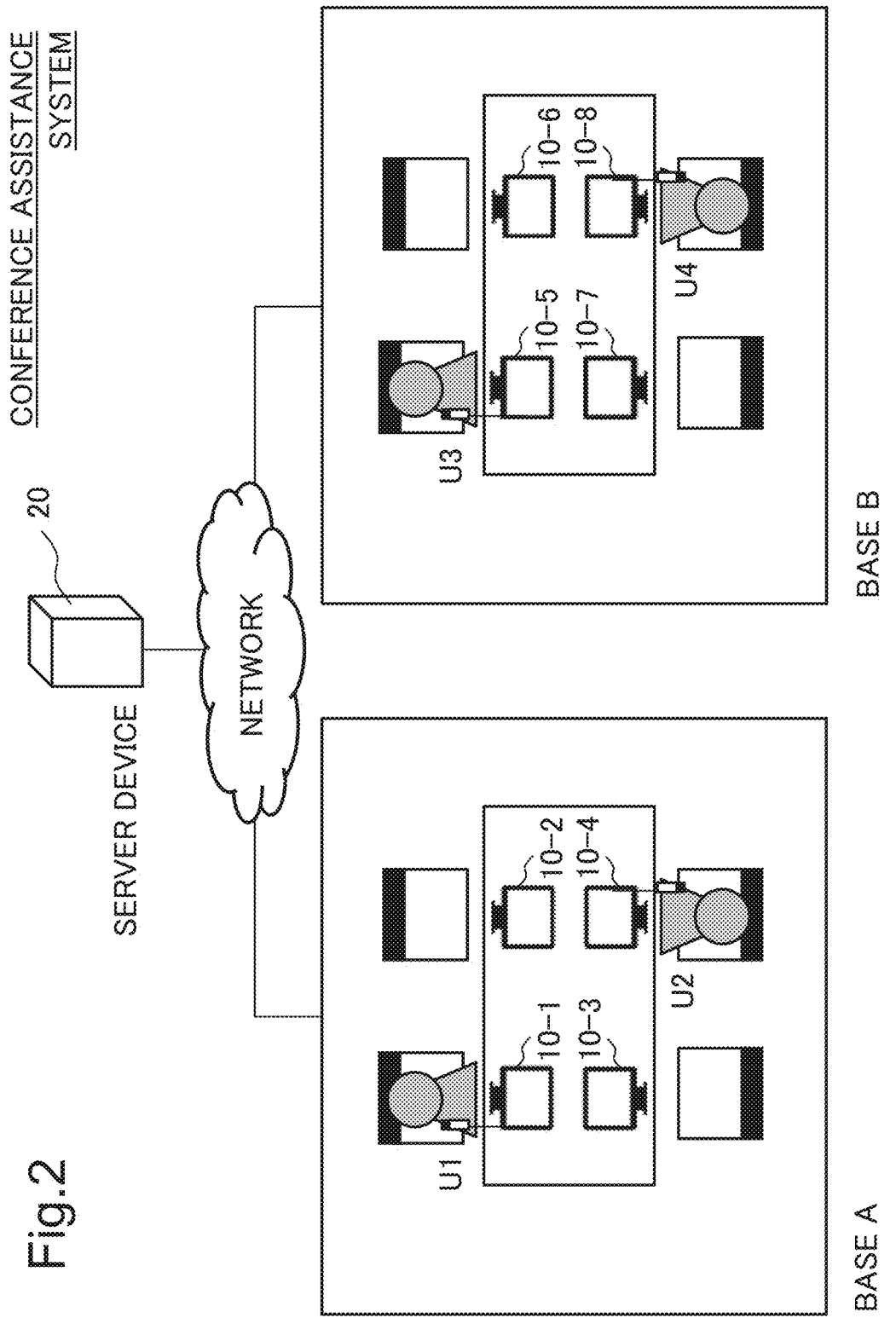
FIG. 2 is a diagram illustrating an example of an overall configuration of a conference assistance system according to a first example embodiment.

FIG. 2 is a diagram illustrating an example of an overall configuration of a conference assistance system according to the first example embodiment. As illustrated in FIG. 2, a plurality of bases is connected and a video conference is performed. A conference room terminal is installed in a conference room of each base. In the example of FIG. 2, conference room terminals 10-1 to 10-4 are installed in the conference room of the base A. Similarly, conference room terminals 10-5 to 10-8 are installed in the conference room of the base B. In the following description, when there is no particular reason to distinguish the conference room terminals 10-1 to 10-8 from each other, they are simply referred to as "conference room terminals 10."

Although not illustrated in FIG. 2, in the conference room of each base, a camera device that can acquire a bird's eye view image of the entire conference room and a speaker that outputs voice of the partner are installed.

Each of the plurality of conference room terminals 10 and the server device 20 are connected by wired or wireless communication means and are able to communicate with each other. The server device 20 may be installed in either the base A or the base B or may be installed on a network (on a cloud) as illustrated in FIG. 2.

The configuration illustrated in FIG. 2 is exemplary and is, of course, not intended to limit the number of bases participating in the video conference or the number of conference room terminals 10 or the like. In the following example embodiments, a conference assistance system that assists with a video conference connecting a plurality of bases will be mainly described. However, the conference to which the conference assistance system according to the present disclosure is applied is not limited to a video conference, and a conference held in the same conference room may be an assistance target.

The conference room terminal 10 is a terminal installed in each seat of the conference room. The participant manipulates the terminal to perform the conference while displaying necessary information or the like. The conference room terminal 10 has a camera function and is able to image a participant who is seated. Further, the conference room terminal 10 can be connected to a microphone (for example, a pin microphone or a wireless microphone). A voice of a participant seated in front of each of the conference room terminals 10 is collected by the microphone. The microphone connected to the conference room terminal 10 is preferably a microphone with strong directivity. This is because it is necessary to collect a voice of a user wearing the microphone, and it is not necessary to collect voices of other people.

The server device 20 is a device that assists with a conference. The server device 20 assists with a conference which is a place for decision making and a place for idea thinking. The server device 20 enables a video conference performed in a plurality of bases. The server device 20 transmits data (packets) related to a voice and a video acquired from one base to other bases. For example, in the example of FIG. 2, voice and video data acquired from the base A are transmitted to the base B.

The server device 20 transmits bird's eye view video data of one base to the other bases. The video data may be displayed on the conference room terminal 10 used by each participant or may be projected by a projector or the like. The server device 20 transmits voice data acquired from one base (voice data acquired from the conference room terminals 10) to the other bases. The voice data may be output from the speaker installed in the conference room or may be output from each conference room terminal 10.

In this way, the server device 20 enables an existing video conference system. An existing technology can be used to enable a video conference system by the server device 20. Therefore, in the following description, implementation and installation of the video conference system will be omitted.

The server device 20 enables of the video conference system and also has a function of providing detailed information regarding participants (attribute information of the participants). For example, when there are four participants in a video conference, as illustrated in FIG. 2, the server device 20 displays information regarding the three other participants on the conference room terminal 10 manipulated by each participant. The server device 20 assists with a conference (video conference) by providing information regarding the other participants. In the following description, detailed information regarding the participant (attribute information such as a face image and a name) is referred to as "participant profile information" or "profile information."

Figure 3:
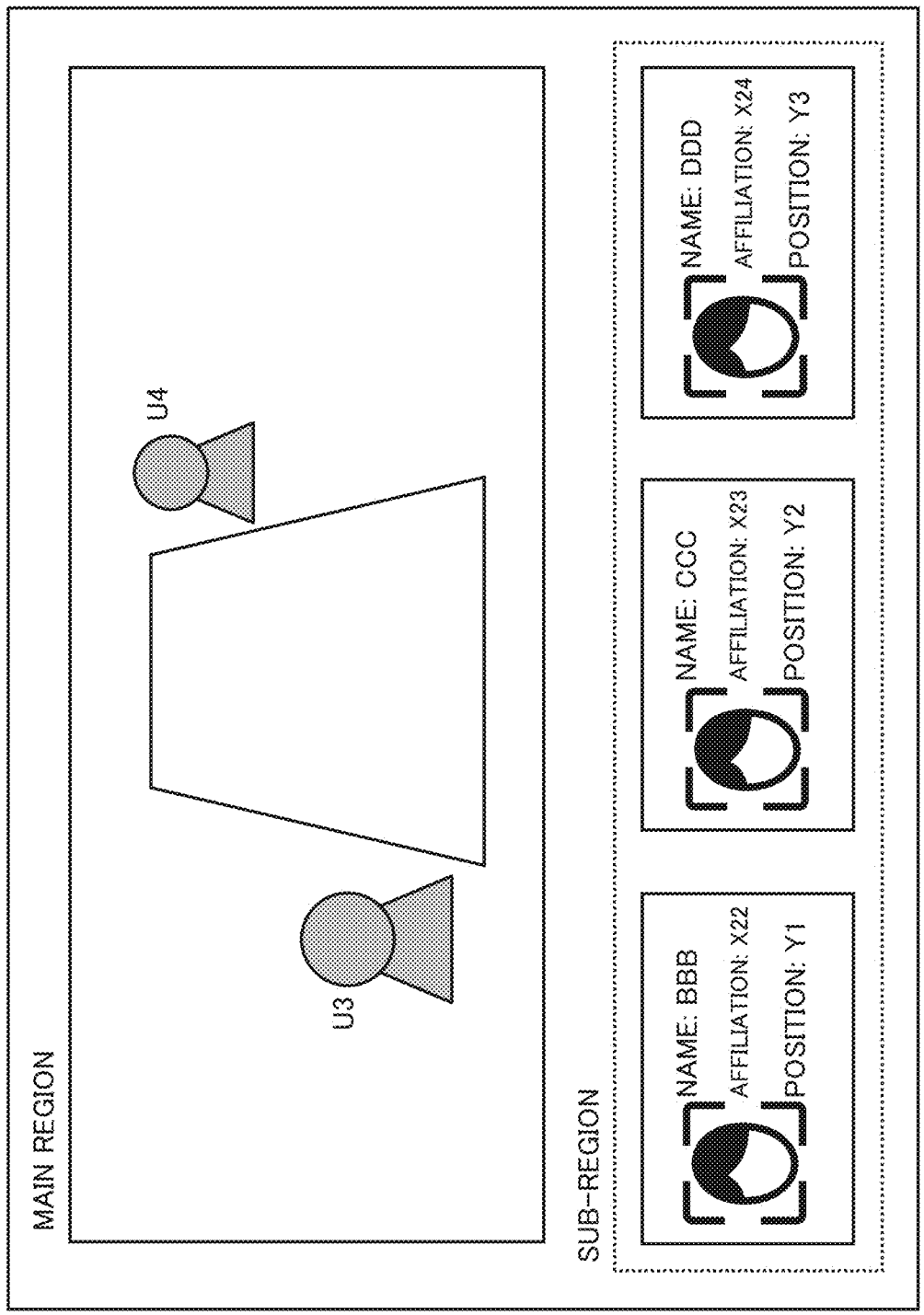
FIG. 3 is a diagram illustrating an example of a screen displayed on a conference room terminal.

For example, a screen as illustrated in FIG. 3 is displayed on the conference room terminal 10-1 used by the participant U1 illustrated in FIG. 2. Referring to FIG. 3, a screen overlooking the base B (a conference room of the base B) is displayed in an upper portion (a main region) of the display area. Profile information of the other participants is displayed in a lower portion of the display area (a sub-region: a region surrounded by a dotted line). In the example of FIG. 3, the profile information of the participants who participate in the video conference in the same base and the profile information of the participants who participate in the video conference in the other base are displayed.

The participant manipulates the conference room terminal 10 in front of the participant and inputs an instruction indicating that she or he wants to view the participant profile information to the server device 20. The conference room terminal 10 receiving the manipulation transmits a "profile provision request" to the server device 20. As a response to the request, the server device 20 transmits data (information) enabling display illustrated in FIG. 3 to the conference room terminal 10.

Of course, the display screen illustrated in FIG. 3 is exemplary and is not intended to limit content, a layout, and the like to be displayed. For example, the profile information of the participant participating in the video conference from the same base may not be displayed, and the main region in the upper portion of the display area may not be displayed when the profile information is displayed. The content displayed as the profile of the participant is not limited to FIG. 3, and other information (for example, a workplace or the like) may be displayed.

<Preliminary Preparation>

Here, to enable conference assistance with the server device 20, a system user (a user scheduled to participate in a video conference) is required to make a preliminary preparation. The preliminary preparation will be described below.

The user registers attribute values such as her or his own biometric information (a face image) and her or his own profile in the system. Specifically, the user inputs her or his face image to the server device 20. The user inputs her or his profile (for example, information such as a name, an employee number, a workplace, an affiliation department, a position, and a contact) to the server device 20.

Any method can be used to input information such as the biometric information and the profile. For example, the user captures her or his face image using a terminal such as a smartphone. Further, the user generates a text file or the like in which the profile is described using the terminal. The user manipulates the terminal to transmit the information (the face image and the profile) to the server device 20. Alternatively, the user may input necessary information to the server device 20 using an external storage device such as a Universal Serial Bus (USB) in which the information is stored.

Alternatively, the server device 20 may have a function of a web server and the user may input necessary information in a form provided by the web server. Alternatively, a terminal inputting the information may be installed in each conference room and the user may input necessary information from the terminal installed in the conference room to the server device 20.

The server device 20 updates a database that manages the system user using the acquired user information (the biometric information, the profiles, and the like). Details of the updating of the database will be described below. The server device 20 generally updates the database in accordance with the following operation. In the following description, a database managing users using the system according to the present disclosure will be referred to as a "user database."

When a person relevant to the acquired user information is a new user who is not registered in the user database, the server device 20 assigns an identifier (ID) to the user. The server device 20 generates a feature amount that characterizes the acquired face image.

The server device 20 adds an entry including the ID assigned to the new user, the feature amount generated from the face image, the face image of the user, the profile, and the like to the user database. When the server device 20 registers the user information, the participants in the conference can use the conference assistance system illustrated in FIG. 2.

Next, details of each device included in the conference assistance system according to the first example embodiment will be described.

[Server Device]

Figure 4:
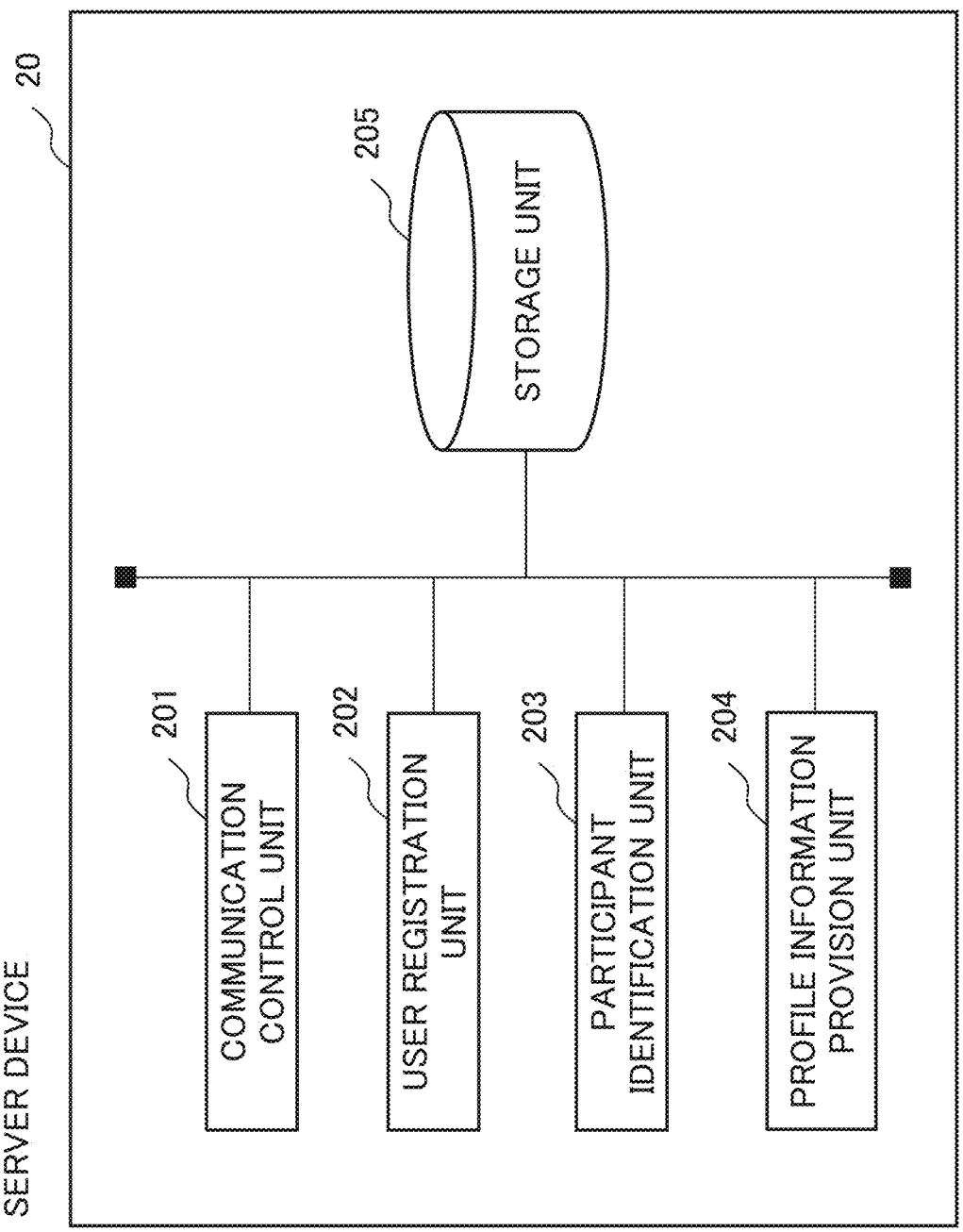
FIG. 4 is a diagram illustrating an example of a processing configuration of a server device according to the first example embodiment.

FIG. 4 is a diagram illustrating an example of a processing configuration (processing module) of the server device 20 according to the first example embodiment. Referring to FIG. 4, the server device 20 includes a communication control unit 201, a user registration unit 202, a participant identification unit 203, a profile information provision unit 204, and a storage unit 205.

The communication control unit 201 is means configured to control communication with other devices. Specifically, the communication control unit 201 receives data (packets) from the conference room terminal 10. The communication control unit 201 transmits data to the conference room terminal 10. The communication control unit 201 delivers data received from other devices to other processing modules. The communication control unit 201 transmits data acquired from other processing modules to other devices. In this way, the other processing modules transmit and receive data to and from other devices via the communication control unit 201.

Figure 5:
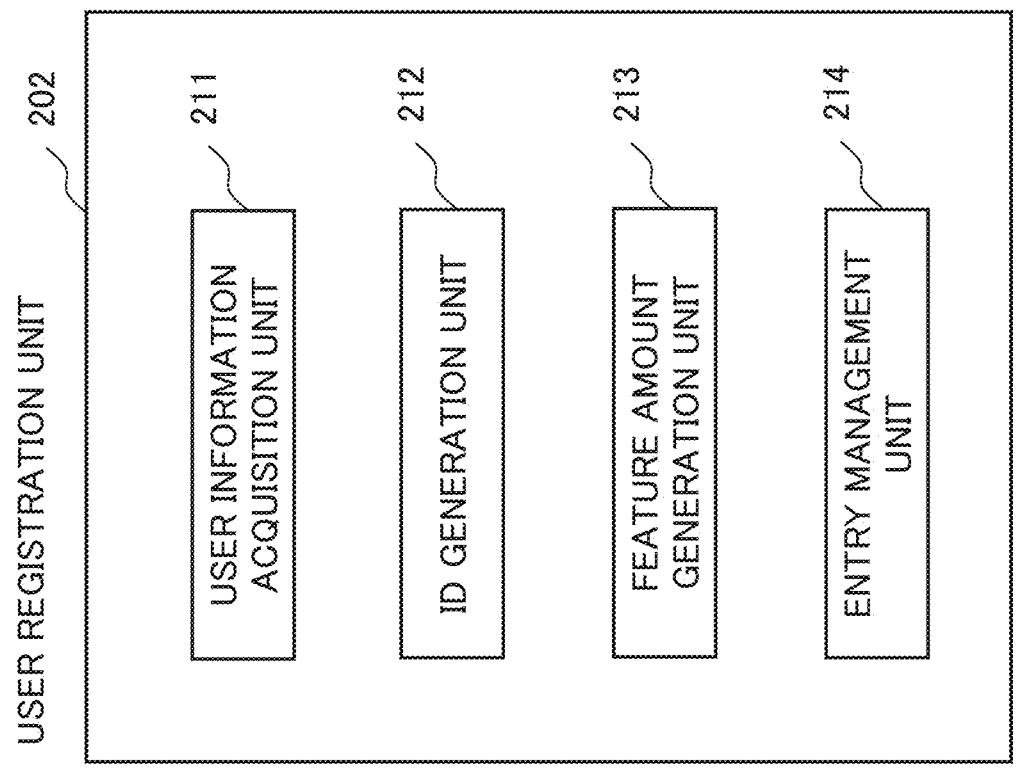
FIG. 5 is a diagram illustrating an example of a processing configuration of a user registration unit according to the first example embodiment.

The user registration unit 202 is means configured to enable the above-described registration of the system user. The user registration unit 202 acquires at least a profile of each of a plurality of users using the conference assistance system. The user registration unit 202 includes a plurality of submodules. FIG. 5 is a diagram illustrating an example of a processing configuration of the user registration unit 202. Referring to FIG. 5, the user registration unit 202 includes a user information acquisition unit 211, an ID generation unit 212, a feature amount generation unit 213, and an entry management unit 214.

The user information acquisition unit 211 is means configured to acquire the above-described user information. The user information acquisition unit 211 acquires biometric information (a face image) and a profile (a name, affiliation, and the like) of each system user. The system user may input the information from a terminal such as a smartphone to the server device 20 or may directly manipulate the server device 20 to input the information.

The user information acquisition unit 211 may provide a graphical user interface (GUI) or a form for inputting the information. For example, the user information acquisition unit 211 displays an information input form illustrated in FIG. 6 on the terminal manipulated by the user.

The system user inputs the information illustrated in FIG. 6. In addition, the system user selects whether to newly register a user in the system or to update the already registered information. When all the information is input, the system user presses a "Transmit" button and inputs the biometric information, the profile, and the like to the server device 20.

The user information acquisition unit 211 stores the acquired user information in the storage unit 205.

The ID generation unit 212 is means configured to generate an ID to be assigned to the system user. The ID generation unit 212 generates a user ID for identifying each of the plurality of system users. More specifically, when the user information input by the system user is information regarding new registration, the ID generation unit 212 generates an ID for identifying a new user. For example, the ID generation unit 212 may calculate a hash value of the acquired user information (the face image and the profile) and use the hash value as an ID to be assigned to the user. Alternatively, the ID generation unit 212 may assign a unique value and use the assigned value as the ID whenever a user is registered. In the following description, an ID generated by the ID generation unit 212 (an ID for identifying a system user) is referred to as a "user ID."

The feature amount generation unit 213 is means configured to generate a feature amount (a feature vector including a plurality of feature amounts) characterizing a face image from the face image included in the user information. Specifically, the feature amount generation unit 213 extracts feature points from the acquired face image. An existing technology can be used for the feature point extraction process, and thus detailed description thereof will be omitted. For example, the feature amount generation unit 213 extracts eyes, a nose, a mouth, and the like as feature points from the face image. Thereafter, the feature amount generation unit 213 calculates a position of each feature point or a distance between the feature points as a feature amount and generates a feature vector including a plurality of feature amounts.

The entry management unit 214 is means configured to manage an entry of the user database. When a new user is registered in the database, the entry management unit 214 adds an entry including the generated user ID, the generated feature amounts, the face image acquired from the terminal or the like of the user, and the profile to the user database.

When information regarding the user already registered in the user database is updated, the entry management unit 214 identifies an entry to be subjected to information updating based on an employee number or the like, and updates the user database using the acquired user information. At that time, the entry management unit 214 may update a difference between the acquired user information and the information registered in the database or may overwrite each item of the database with the acquired user information. Similarly, with regard to the feature amount, the entry management unit 214 may update the database when there is a difference in the generated feature amount or may overwrite the existing feature amount with the newly generated feature amount.

The user registration unit 202 constructs, for example, a user database as illustrated in FIG. 7. It goes without saying that the content registered in the user database illustrated in FIG. 7 is exemplary and is not intended to limit the information registered in the user database. For example, the "feature amount" may not be registered in the user database as necessary. That is, when there is a face image, it is possible to calculate the feature amount and thus the feature amount may be calculated as necessary.

The description will now return to FIG. 4. The participant identification unit 203 is means configured to identify a participant participating in the conference (a participant in the video conference among users registered in the system). The participant identification unit 203 acquires a face image from the conference room terminal 10 in which the participant is seated among the conference room terminals 10 installed in the conference room. The participant identification unit 203 calculates a feature amount from the acquired face image.

The participant identification unit 203 sets a feature amount calculated based on the face image acquired from the conference room terminal 10 as a comparison target and performs a comparison process with the feature amount registered in the user database. More specifically, the participant identification unit 203 sets the above-calculated feature amount (feature vector) as a comparison target and performs one-to-N (where N is a positive integer, the same applies below) comparisons with a plurality of feature vectors registered in the user database.

The participant identification unit 203 calculates similarity between a comparison target feature amount and each of the plurality of feature amounts of a registration side. In the similarity, a chi-square distance, a Euclidean distance, or the like can be used. The longer the distance is, the lower the similarity is. The shorter the distance is, the higher similarity is.

The participant identification unit 203 identifies a feature amount with similarity with the feature amount of the comparison target equal to or greater than a predetermined value and having the highest similarity among the plurality of feature amounts registered in the user database.

The participant identification unit 203 reads the user ID relevant to the feature amount obtained as results of the one-to-N comparisons from the user database.

The participant identification unit 203 repeats the above-described process on the face image acquired from each of the conference room terminals 10, and identifies the user ID relevant to each face image. The participant identification unit 203 generates a participant list by associating the identified user ID, the ID of the conference room terminal 10 which is a transmission source of the face image, and the base of the participant. As the ID of the conference room terminal 10, a media access control (MAC) address or an Internet protocol (IP) address of the conference room terminal 10 can be used.

For example, in the example of FIG. 2, a participant list illustrated in FIG. 8 is generated. In FIG. 8, to facilitate understanding, reference numerals assigned to the conference room terminal 10 are described as conference room terminal IDs. A "participant ID" included in the participant list is a user ID registered in the user database.

Note that, by inputting a relationship between the conference room terminal ID and the base (conference room) where each conference room terminal 10 is installed to the server device 20 in advance, the server device 20 can ascertain from which base each participant participates in the video conference using the conference room terminal ID.

The profile information provision unit 204 is means configured to provide profile information regarding other participants to the participants of the video conference. The profile information provision unit 204 provides one participant participating in a conference from among a plurality of system users with a profile regarding the other participants participating in the same conference as the conference in which the one participant participates.

The profile information provision unit 204 processes the "profile provision request" acquired from the conference room terminal 10. Specifically, the profile information provision unit 204 identifies a conference room terminal ID of a transmission source of the request. The profile information provision unit 204 identifies the participant making the request from the identified conference room terminal ID with reference to the participant list.

The profile information provision unit 204 identifies a participant ID that is a participant ID included in the participant list other than the participant transmitting the profile provision request. For example, in the example of FIG. 8, when the profile provision request is transmitted from the conference room terminal 10-1, the participant IDs of the IDs 02 to 04 are identified.

The profile information provision unit 204 extracts (collects) information to be transmitted as participant profile information from each field of the entry relevant to the identified participant ID with reference to the user database. For example, as illustrated in FIG. 3, when "face image," "name," "affiliation," and "position" of the participant are displayed as profile information, the profile information provision unit 204 reads the information from the user database.

Alternatively, the profile information provision unit 204 may read registration values (attribute values such as names) of all the fields registered in the user database from the database in such a manner that information can be selected in the conference room terminal 10.

The profile information provision unit 204 transmits a response including the read information (a response to the profile provision request) to the conference room terminal 10 which is a transmission source of the request.

The storage unit 205 is means configured to store information necessary for the operation of the server device 20.

[Conference Room Terminal]

Figure 9:
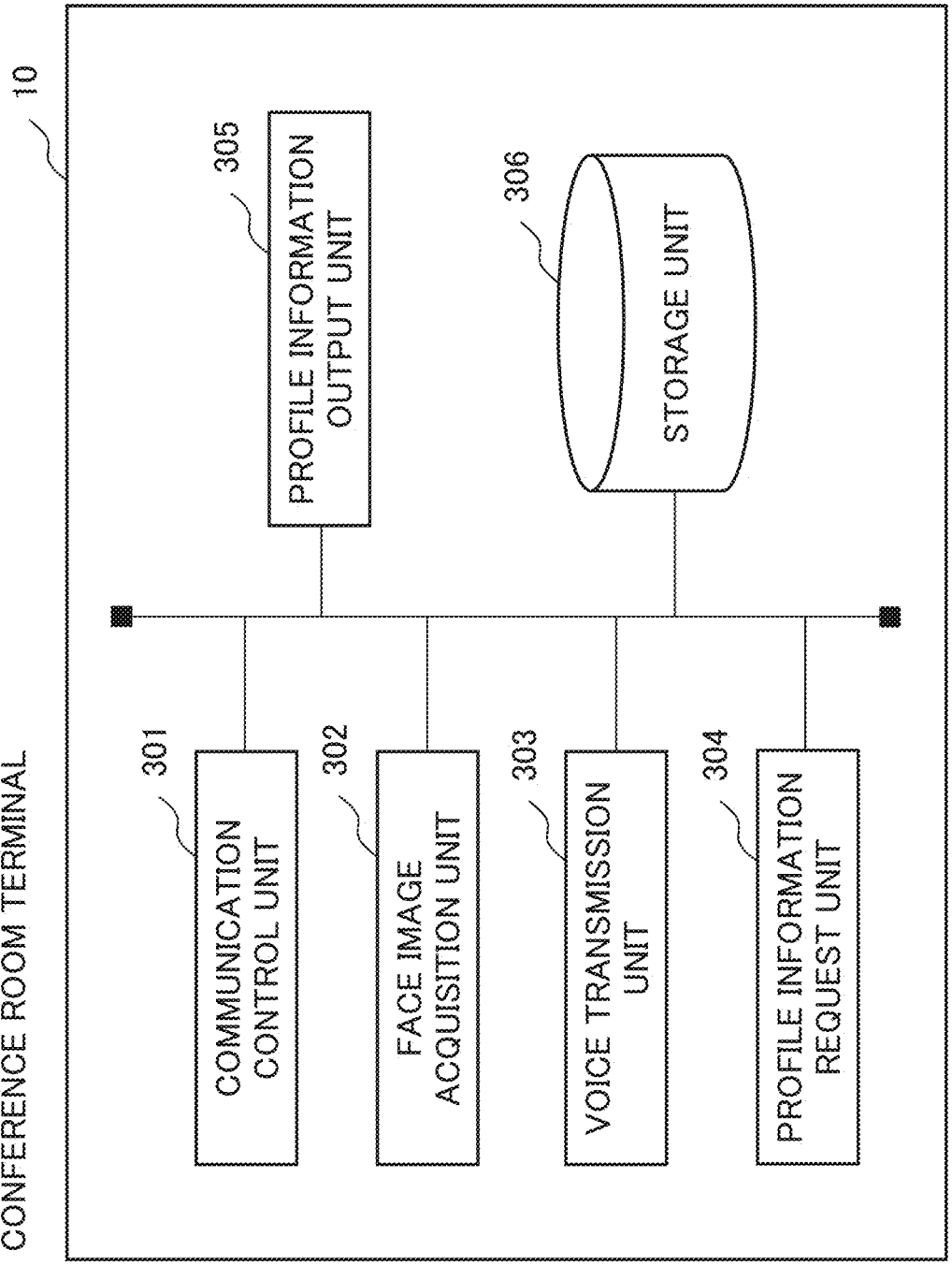
FIG. 9 is a diagram illustrating an example of a processing configuration of the conference room terminal according to the first example embodiment.

FIG. 9 is a diagram illustrating an example of a processing configuration (a processing module) of the conference room terminal 10. Referring to FIG. 9, the conference room terminal 10 includes a communication control unit 301, a face image acquisition unit 302, a voice transmission unit 303, a profile information request unit 304, a profile information output unit 305, and a storage unit 306.

The communication control unit 301 is means configured to control communication with other devices. Specifically, the communication control unit 301 receives data (packets) from the server device 20. The communication control unit 301 transmits data to the server device 20. The communication control unit 301 delivers data received from other devices to other processing modules. The communication control unit 301 transmits data acquired from other processing modules to other devices. In this way, the other processing modules transmit and receive data to and from other devices via the communication control unit 301.

The face image acquisition unit 302 is means configured to control the camera device and acquire a face image (biometric information) of a participant seated in front of the own device. The face image acquisition unit 302 images the front of the own device periodically or at a predetermined timing. The face image acquisition unit 302 determines whether a face image of a person is included in the acquired image and extracts the face image from the acquired image data when the face image is included. The face image acquisition unit 302 transmits a set of the extracted face image and the ID (a conference room terminal ID; for example, an IP address) of the own device to the server device 20.

Since an existing technology can be used for a face image detection process and a face image extraction process by the face image acquisition unit 302, detailed description thereof will be omitted. For example, the face image acquisition unit 302 may extract a face image (a face area) from image data by using a learning model learned with a convolutional neural network (CNN). Alternatively, the face image acquisition unit 302 may extract a face image using a scheme such as template matching.

The voice transmission unit 303 is means configured to acquire a voice of a participant and transmit the acquired voice to the server device 20. The voice transmission unit 303 acquires a voice file related to a voice collected by a microphone (for example, a pin microphone). For example, the voice transmission unit 303 acquires a voice file encoded in a format such as a waveform audio file (WAV file).

The voice transmission unit 303 analyzes the acquired voice file and transmits a voice file including a voice section (a section in which there is no silence; a speech of a participant) to the server device 20 when the voice file includes the voice section. At that time, the voice transmission unit 303 transmits the voice file and the ID (the conference room terminal ID) of the own device to the server device 20.

Alternatively, the voice transmission unit 303 may assign the conference room terminal ID to the voice file acquired from the microphone and transmit the voice file, as it is, to the server device 20. In this case, the voice file acquired by the server device 20 may be analyzed to extract the voice file including the voice.

The voice transmission unit 303 extracts a voice file (a voice file with no silence) including a speech of a participant by using an existing "voice detection technology." For example, the voice transmission unit 303 detects the voice using a voice parameter sequence or the like modeled by a hidden Markov model (HMM).

Figure 10:
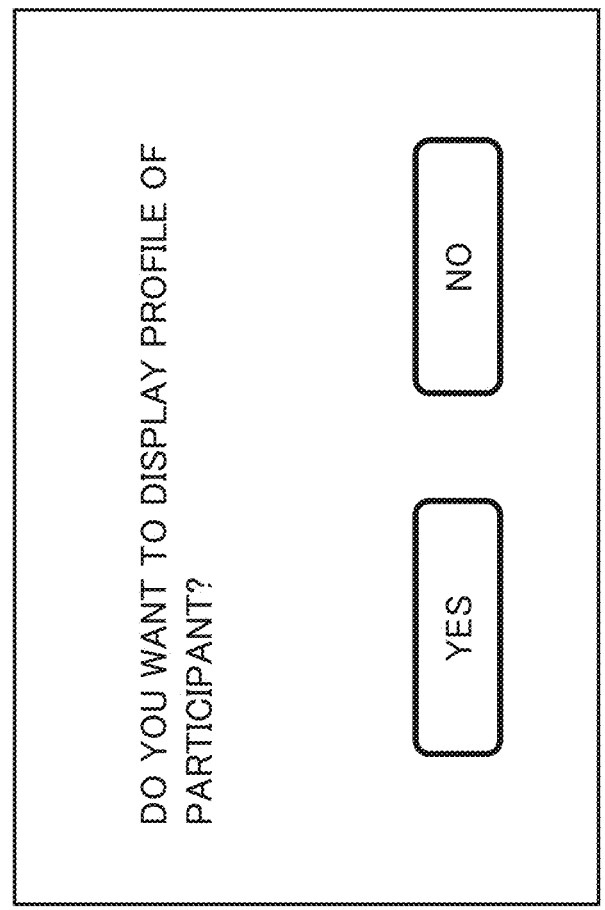
FIG. 10 is a diagram illustrating an operation of a profile information request unit according to the first example embodiment.

The profile information request unit 304 is means configured to generate the above-described "profile provision request" in response to a manipulation of the participant and transmit the request to the server device 20. For example, the profile information request unit 304 generates a GUI used for the participant to input information. For example, the profile information request unit 304 displays a screen as illustrated in FIG. 10 on the display.

When the participant desires to provide information regarding profiles of other people, the profile information request unit 304 transmits a profile provision request including the ID (the conference room terminal ID) of the own device to the server device 20.

The profile information request unit 304 acquires a response to the request from the server device 20. The profile information request unit 304 delivers the acquired response to the profile information output unit 305.

The profile information output unit 305 is means configured to output participant profile information regarding other participants based on the response acquired from the server device 20. For example, the profile information output unit 305 performs display illustrated in FIG. 3 using the information acquired from the server device 20.

Figure 11:
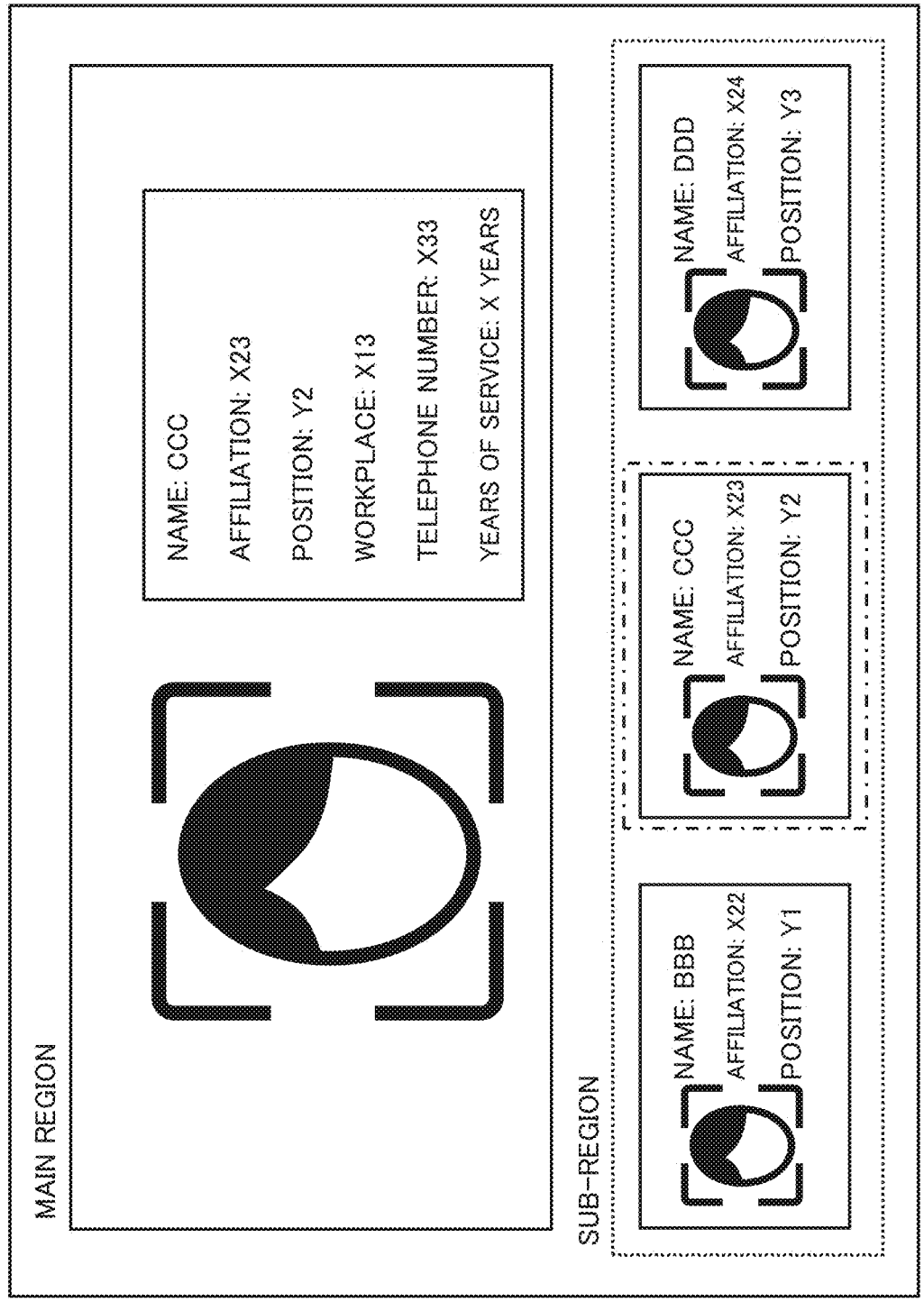
FIG. 11 is a diagram illustrating the operation of a profile information output unit according to the first example embodiment.

Alternatively, the profile information output unit 305 may perform display illustrated in FIG. 11. Referring to FIG. 11, the profile information output unit 305 simply displays each participant in the sub-region indicated by the dotted line. The profile information output unit 305 may display more detailed information regarding a person selected by the participant (a person surrounded by an alternate long and short dash line in FIG. 11) in the main area. In this case, the server device 20 transmits more detailed information regarding each participant to the conference room terminal 10.

Alternatively, the profile information output unit 305 may include a button or the like for switching an item to be displayed and change content to be displayed in response to a press of the button.

Alternatively, the profile information output unit 305 may display the profile on a face photo of a participant. For example, the profile information output unit 305 may perform display such as augmented reality (AR) on the face photo with regard to the profile.

Alternatively, the profile information output unit 305 may emphasize a profile of a participant who is speaking (for example, the profile of the participant is enlarged and surrounded by a dotted line or the like.). Alternatively, the profile information output unit 305 may highlight and display the profile according to attributes of other participants (for example, when the participant is a person outside the company, a director, or the like). Alternatively, the profile information output unit 305 may display a linked profile regarding a contact of another participant. The participant may make a contact the other person using the link. Alternatively, the profile information output unit 305 may select a profile and display a "registration" button or the like for registering the selected profile in the contact book.

The storage unit 306 is means configured to store information necessary for an operation of the conference room terminal 10.

[Operation of Conference Assistance System]

Next, an operation of the conference assistance system according to the first example embodiment will be described.

Figure 12:
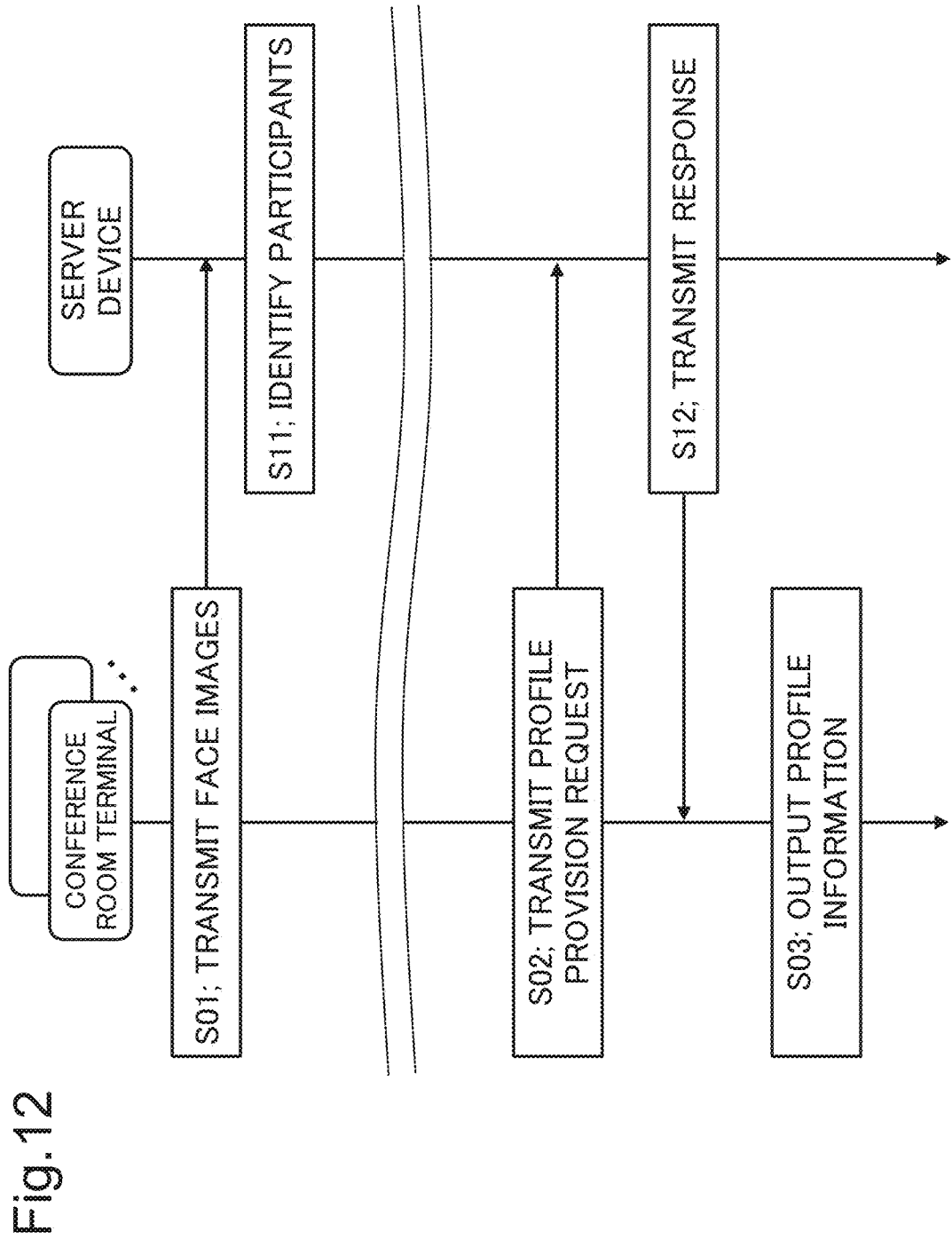
FIG. 12 is a sequence diagram illustrating an example of an operation of the conference assistance system according to the first example embodiment.

FIG. 12 is a sequence diagram illustrating an example of an operation of the conference assistance system according to the first example embodiment. FIG. 12 is a sequence diagram illustrating an example of a system operation when a conference is actually held. It is assumed that a system user is registered in advance before the operation of FIG. 12.

When a conference starts and participants are seated, the conference room terminal 10 acquires face images of the seated participants and transmits the face images to the server device 20 (step S01).

The server device 20 identifies the participants using the acquired face images (step S11). The server device 20 identifies the participants of the conference among a plurality of system users registered in advance through a comparison process using the face images acquired from the participants and the face images registered in the user database. More specifically, the server device 20 sets feature amounts calculated from the acquired face images as feature amounts of a comparison side and sets a plurality of feature amounts registered in the user database as feature amounts of the registration side and executes one-to-N comparison. The server device 20 repeats the comparison for each participant (the conference room terminal 10 used by the participant) in the conference and generates a participant list.

A participant who intends to know the profiles or the like of other participants during the conference inputs the intention to the conference room terminal 10. The conference room terminal 10 transmits a "profile provision request" to the server device 20 in response to the input (step S02).

The server device 20 acquires the face images, the profiles, and the like of the participants participating in the conference with reference to the user database. Thereafter, the server device 20 transmits a response including the acquired face images, the profiles, and the like to the conference room terminal 10 (step S12).

The conference room terminal 10 outputs the participant profile information based on the acquired response (step S03).

As described above, the server device 20 according to the first example embodiment includes a user database that stores a user ID generated by the ID generation unit 212, a face image of a user, and a profile in association. The profile information provision unit 204 of the server device 20 acquires the face image and the profile of the participants from the user database using the user ID of the participant participating in the conference. The server device 20 transmits the acquired face image and profile to the conference room terminal 10 used by the participant. As a result, even when the participants meet each other for the first time, the participants can easily acquire information regarding the other participants by manipulating the conference room terminal 10 in front and transmitting the profile provision requests of the other participants to the server device 20.

Second Example Embodiment

Next, a second example embodiment will be described in detail with reference to the drawings.

In the second example embodiment, a case in which a plurality of attribute values (setting values) is permitted for some or all of the items among items input as profiles by users will be described. For example, the second example embodiment will be described on the assumption that a system user work as an employee of a company and a professor of a university. In the second example embodiment, a case in which an optimum attribute value is automatically selected from the plurality of attribute values when the participant profile information is displayed on the conference room terminal 10 will be described.

The configuration of the conference assistance system according to the second example embodiment can be the same as that of the first example embodiment, and thus description equivalent to FIG. 2 will be omitted. Since processing configurations of the conference room terminal 10 and the server device 20 according to the second example embodiment can be the same as those of the first example embodiment, description thereof will be omitted. Hereinafter, differences between the first and second example embodiments will be mainly described. The first participant uses a first terminal (for example, the conference room terminal 10-1), and the second participant uses a second terminal (for example, the conference room terminal 10-5).

The user registration unit 202 of the server device 20 can acquire a plurality of attribute values for the same item with regard to the profiles of the system users. For example, the user information acquisition unit 211 of the user registration unit 202 displays an information input form illustrated in FIG. 13 on the terminal manipulated by the user.

For example, when the system users belong to different organizations (companies, universities, or the like), the system users input information regarding each affiliation organization. When all the information is input, the system user presses a "Transmit" button and inputs the biometric information, the profile, and the like to the server device 20.

The user information acquisition unit 211 stores the acquired user information in the storage unit 205.

The entry management unit 214 of the user registration unit 202 adds an entry including the profile acquired from the user to the user database. As a result, the user database as illustrated in FIG. 14 is constructed.

When a profile provision request is received, the profile information provision unit 204 generates a response to the profile provision request. At this time, when a plurality of attribute values is set for the same item (the same type of item) among items of a profile registered in the user database, the profile information provision unit 204 selects an optimum attribute value from the plurality of attribute values and includes the selected attribute value in the response to the request.

For example, in the example of FIG. 14, for a user with ID01, two attribute values are set for each of the affiliation organization and the affiliation department. In this case, the profile information provision unit 204 selects one of the affiliation organizations 1 and 2 and one of the affiliation departments 1 and 2 when the profile information regarding the user with ID01 is generated.

The profile information provision unit 204 selects an optimum attribute value from a plurality of attribute values set to the same item on the basis of various standards and rules.

For example, the profile information provision unit 204 may select an optimum attribute value on the basis of a day of week on which the conference is held.

For example, the profile information provision unit 204 may select an optimum attribute value according to a purpose of the conference. For example, when the profile provision request is made, the participant inputs the purpose of the conference to the server device 20. For example, the conference room terminal 10 may display an item for inputting "purpose of conference" on the GUI illustrated in FIG. 10. A manager or the like inputs (registers) a relationship between the purpose of the conference and the attribute value to be selected to the server device 20 in advance as table information.

For example, the profile information provision unit 204 may select an optimum attribute value from a conversation between the participants. The profile information provision unit 204 analyzes a voice acquired from the conference room terminal 10 and determines a purpose of the conversation. Specifically, the profile information provision unit 204 extracts a keyword from the speech of the participant and calculates a speech frequency of the extracted keyword. The profile information provision unit 204 determines that the keyword with a high speech frequency clearly indicates the purpose of the conversation and determines the purpose of the conference.

The manager or the like inputs the keyword extracted by the profile information provision unit 204 to the server device 20 in advance. The manager or the like also inputs table information in which a keyword with a high speech frequency is associated with the purpose of the conference or table information in which the purpose of the conference is associated with an attribute value to be selected to the server device 20 in advance. When the keyword is extracted from the speech of the participant, it is necessary to transform the speech (voice) into text, but the description of the transformation into text can be made with reference to description of the text transformation unit 222 to be described below.

For example, the profile information provision unit 204 may determine an attribute value to be selected from the profile of the participant. For example, the profile information provision unit 204 may select the same attribute value as the attribute value of an information provision requester. For example, in the example of FIG. 14, the affiliation organizations of user IDs 01, 03, and 04 are the same. When the users participate in the same conference and acquire an information provision request from the participant with ID03, the profile information provision unit 204 selects the same affiliation organization as the participant with ID03 when the affiliation organization related to the participant with ID01 is selected.

In the second example embodiment, the server device 20 selects an optimum attribute value among a plurality of attribute values related to the same item. Further, the server device 20 presents the selected attribute value to the participant in the conference room terminal 10, and thus convenience is improved. However, the conference room terminal 10 may display a plurality of attribute values. For example, the profile information provision unit 204 may assign priority to each of a plurality of attribute values and transmit the attribute values to the conference room terminal 10. For example, the profile information provision unit 204 sets the priority of the attribute value selected by the above-described method to be high. The server device 20 transmits a response including the profile including the attribute value to which the priority is assigned to the conference room terminal 10. The conference room terminal 10 may display the plurality of acquired attribute values and display the emphasized attribute values with high priority.

In the above description, the case in which the server device 20 automatically selects one or more attribute values from the plurality of attribute values of the same item has been described, but the automatic selection may be performed in the conference room terminal 10. In this case, the server device 20 may transmit attribute values of all the fields of the participants of the conference registered in the user database to the conference room terminal 10.

When one attribute value is selected from the plurality of attribute values and one attribute value is selected from the plurality of attribute values of other items, the server device 20 may associate the selection of the attribute value. For example, when "university" is selected as the attribute value of the workplace, a mail address of "university" is selected as the attribute value of the contact in association.

As described above, when the profile of the user is acquired, the server device 20 according to the second example embodiment can acquire a plurality of attribute values (for example, a company, a university, or the like as a workplace) for the same item (for example, an affiliation organization or the like). When there are items of which a plurality of attribute values is set in the profile of the other participants, the server device 20 selects one or more attribute values among the plurality of attribute values and provides the selected one or more attribute values to the participants. That is, the server device 20 selects an optimum attribute value among the plurality of attribute values related to the same item and provides the optimum attribute value to the participant. Therefore, the participant can recognize the affiliation or the like of other participants accurately and can have a more appropriate discussion.

Third Example Embodiment

Next, a third example embodiment will be described in detail with reference to the drawings.

In the third example embodiment, in addition to display of profile information of a participant, a case in which a simple opinion expression (intention expression) for a speech of another participant can be performed will be described.

Since a configuration of the conference assistance system according to the third example embodiment can be the same as those of the first and second example embodiments, description equivalent to FIG. 2 is omitted. Hereinafter, differences between the first to third example embodiments will be mainly described.

Figure 15:
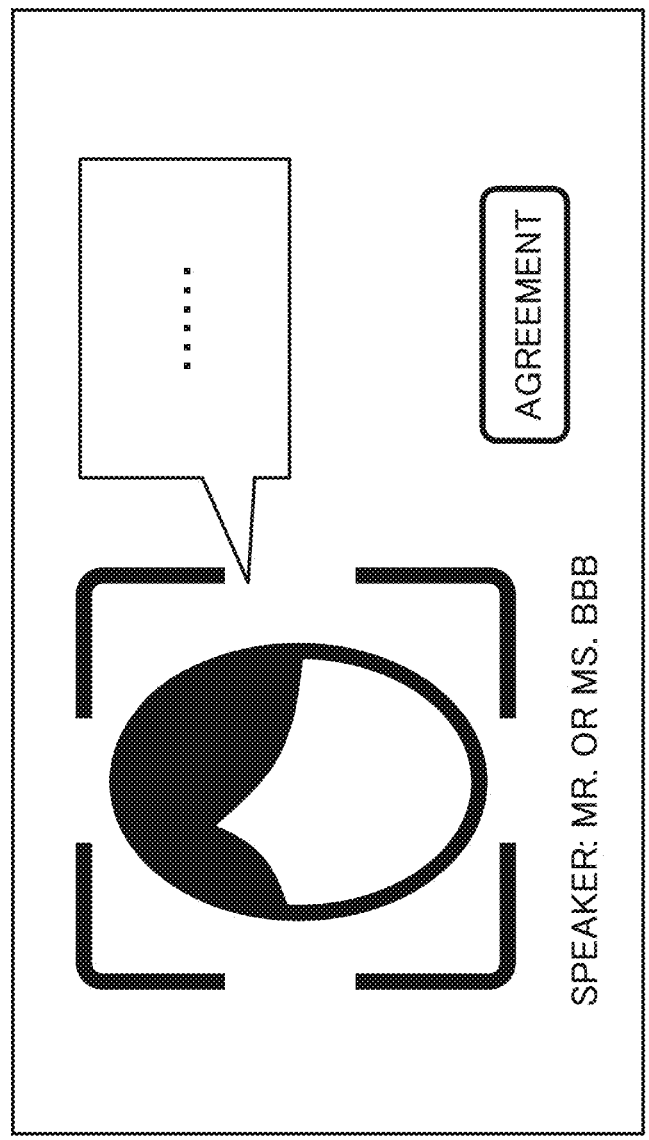
FIG. 15 is a diagram illustrating an operation of a conference room terminal according to a third example embodiment.

For example, as illustrated in FIG. 15, the conference room terminal 10 displays a face photo of the participant and her or his speech. At that time, when a participant agrees with a speech of another participant, the conference room terminal 10 provides an interface through which the participant inputs the agreement of the speech to the conference room terminal 10. For example, the conference room terminal 10 displays an "agreement button" illustrated in FIG. 15 and acquires an opinion of a participant about a speech of another participant by pressing the button.

The server device 20 generates statistical information of an opinion regarding the speech of another participant for each participant, includes the generated statistical information in a response to the "profile provision request," and transmits the generated statistical information to the conference room terminal 10. In the following description, statistical information regarding the opinion of the participant with respect to the speech of another person is referred to as "participant's opinion statistical information". For example, the server device 20 generates a ratio (agreement ratio) of speeches with which each participant has agreed to the speeches of the participant U1 (speeches in the entire conference) as a participant's opinion statistical information.

Figure 16:
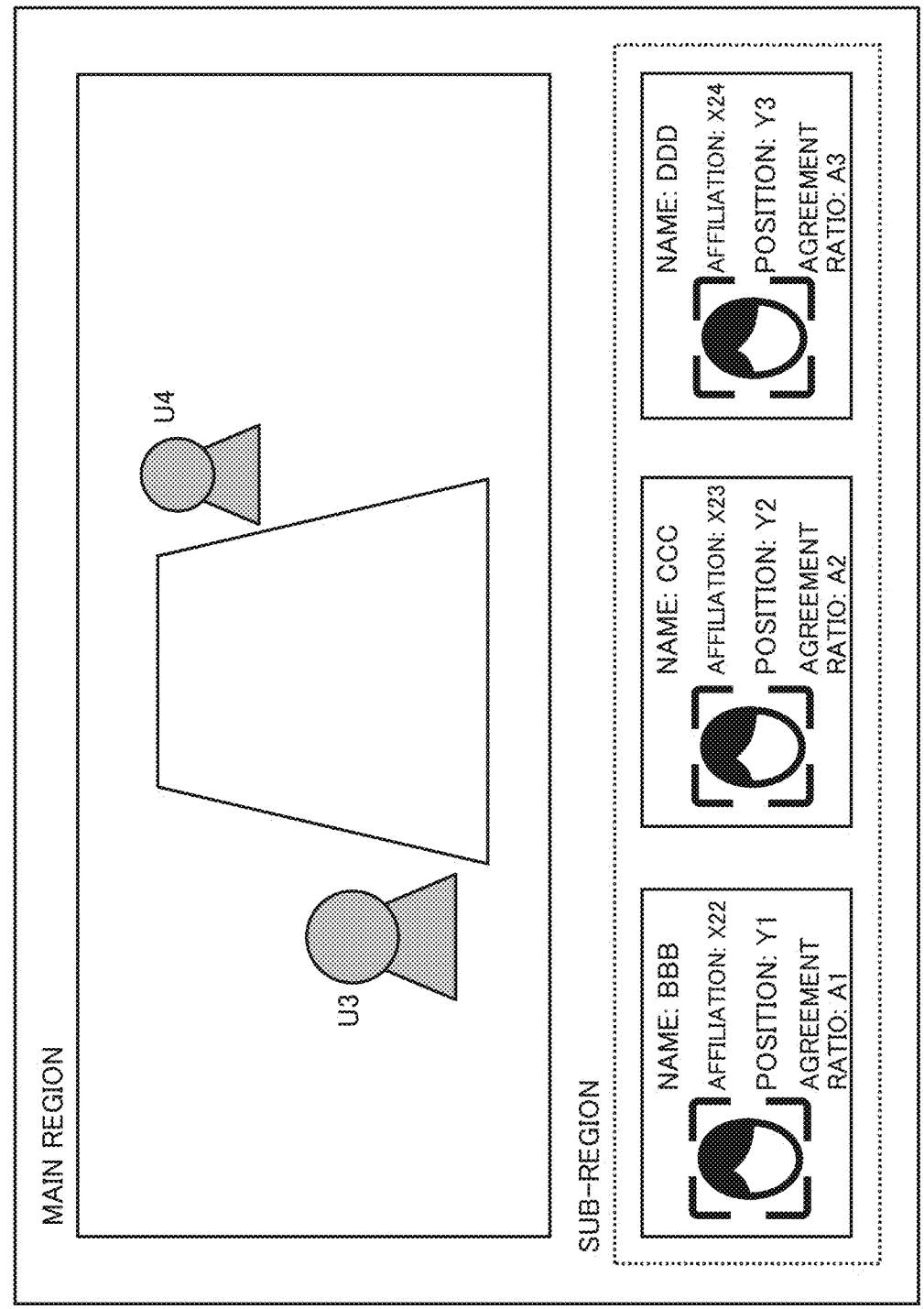
FIG. 16 is a diagram illustrating an operation of the conference room terminal according to the third example embodiment.

The conference room terminal 10 performs display illustrated in FIG. 16 using the received response. The participant in contact with the display illustrated in FIG. 16 can know opinions (views) of the other participants regarding the own speech. In a normal video conference, it is difficult to know the thinking of other participants on a screen. This is because it is difficult for the participant to perceive a subtle change in an expression of a partner as in a face-to-face conference. However, with the conference assistance by the server device 30 according to the third example embodiment, the participants can know the opinions of other participants about the own speeches.

[Conference Room Terminal]

Figure 17:
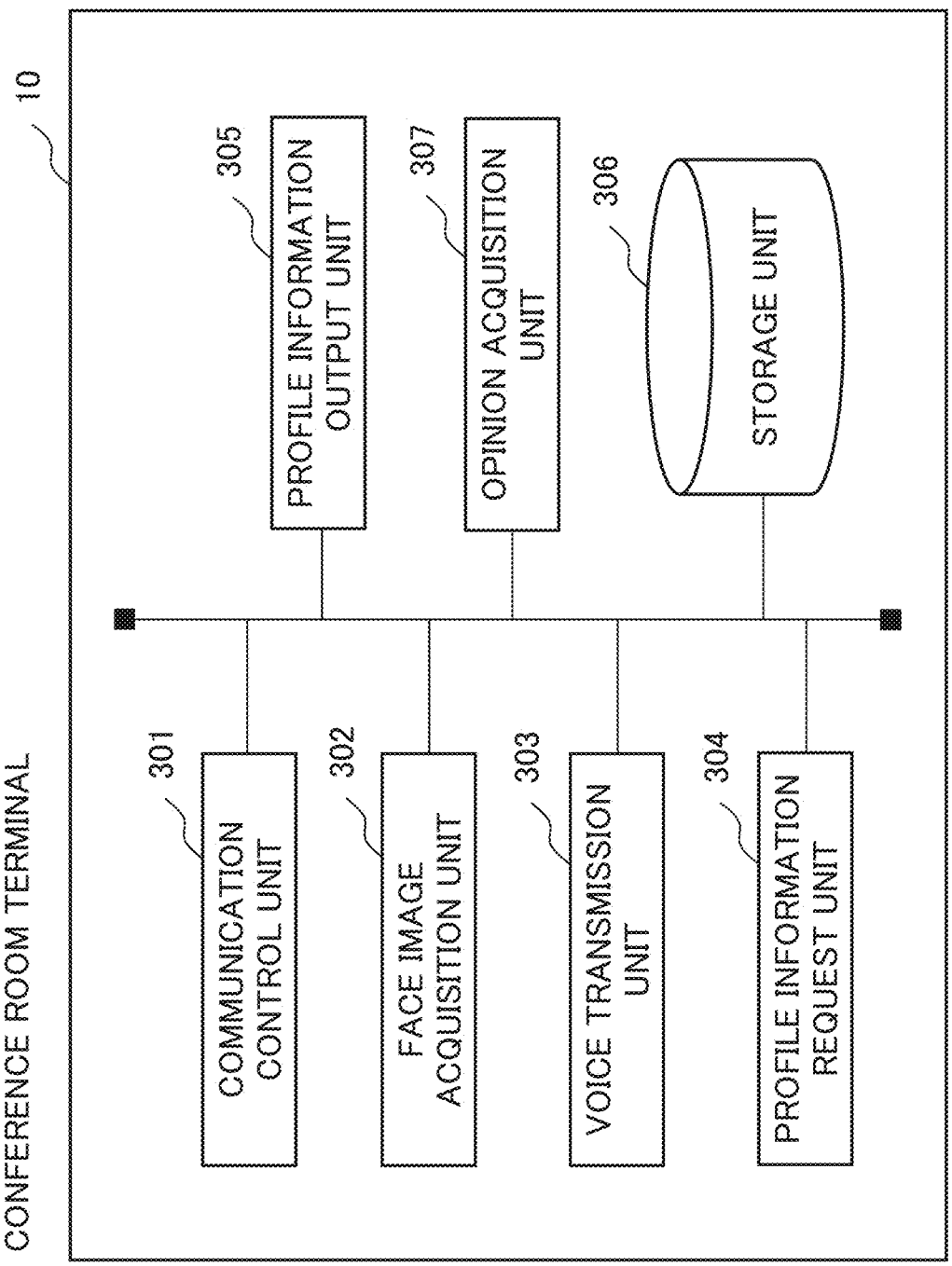
FIG. 17 is a diagram illustrating an example of a processing configuration of the conference room terminal according to the third example embodiment.

FIG. 17 is a diagram illustrating an example of a processing configuration (processing module) of the conference room terminal 10 according to the third example embodiment. Referring to FIG. 17, an opinion acquisition unit 307 is added to the configuration of the conference room terminal 10 according to the first example embodiment.

The opinion acquisition unit 307 is means configured to acquire an opinion of a participant about a speech of another person (an opinion of a participant who operates the own device). The opinion acquisition unit 307 acquires "speaker information" from the server device 20. As details of the speaker information will be described below, the information includes an ID (a speech ID to be described below) with which a speech is identified, a face photo of a current speaker, speech content, and the name of the speaker.

The opinion acquisition unit 307 generates an interface used for the participant to express her or his opinion on the displayed speech while displaying the information included in the speaker information. For example, the opinion acquisition unit 307 displays an "agreement button" as illustrated in FIG. 15.

The display illustrated in FIG. 15 is exemplary, and various forms and forms can be considered in the display by the opinion acquisition unit 307. For example, the opinion acquisition unit 307 may display a button indicating "disagreement" with respect to the speech. Alternatively, the opinion acquisition unit 307 may display a "neutral button" indicating that a speech is neither agreed nor disagreed.

The opinion acquisition unit 307 transmits thinking of the participant (a view of the participant) with respect to the speech of another participant to the server device 20. Specifically, the opinion acquisition unit 307 transmits, to the server device 20, the speech ID of the speech in which the participant has expressed the opinion, the conference room terminal ID of the own device, and the opinion of the participant (for example, agreement, disagreement, and neutrality of a speech). In the following description, information transmitted from the opinion acquisition unit 307 to the server device 20 is referred to as "participant's view information." That is, the information for notifying the server device 20 of her or his own thinking and view of the speech of another participant is the "participant's view information."

The profile information output unit 305 displays the profile information on the basis of a response received from the server device. At that time, the profile information output unit 305 displays statistical information (participants' opinions statistical information; for example, an agreement ratio for the speech) regarding the opinions of other participants about the speech of the participant seated in front of the own device. For example, the profile information output unit 305 performs display as illustrated in FIG. 16.

[Server Device]

Figure 18:
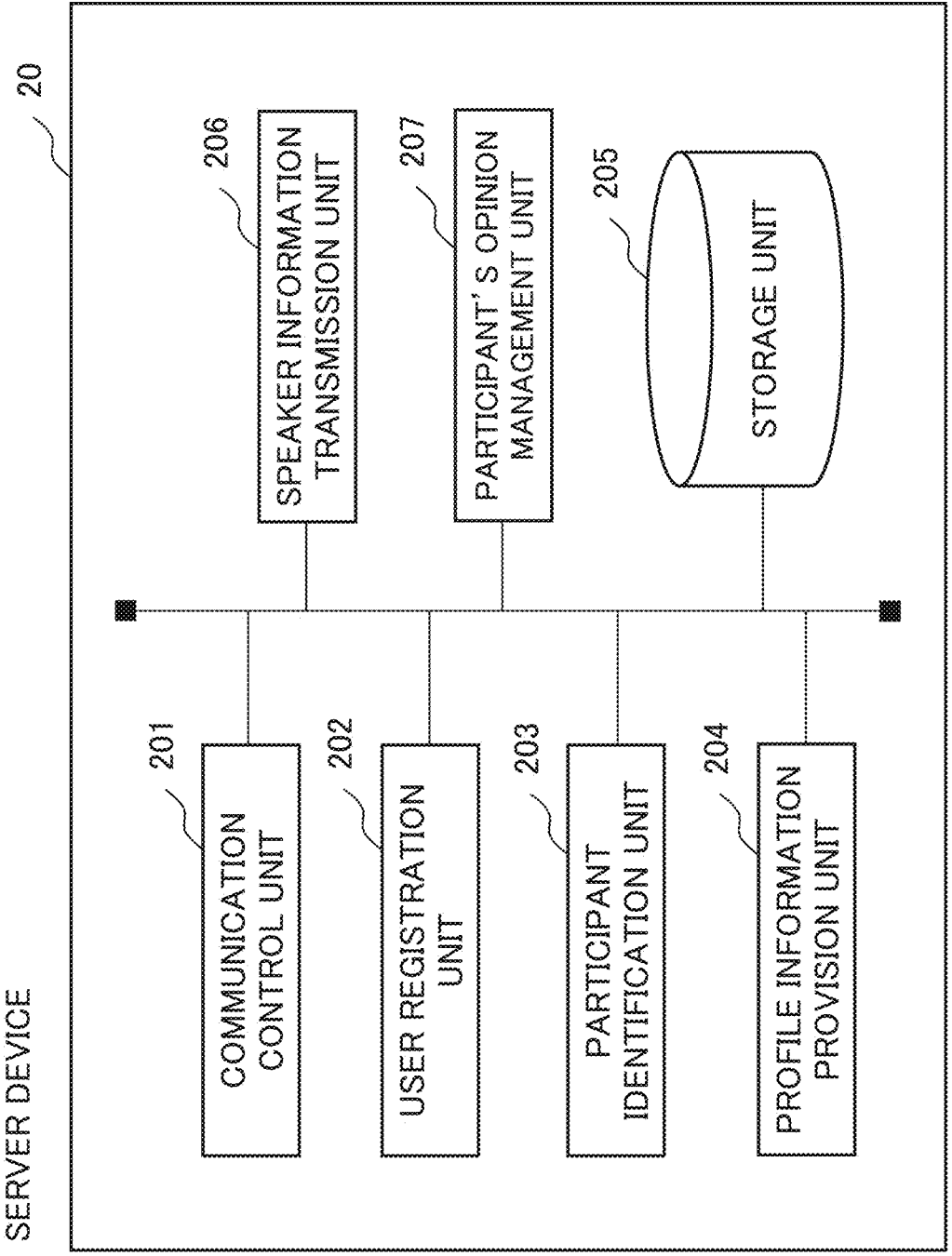
FIG. 18 is a diagram illustrating an example of a processing configuration of a server device according to the third example embodiment.

FIG. 18 is a diagram illustrating an example of a processing configuration (processing module) of the server device 20 according to the third example embodiment. Referring to FIG. 18, a speaker information transmission unit 206 and a participant's opinion management unit 207 are added to the configuration of the server device 20 according to the first example embodiment.

The speaker information transmission unit 206 is means configured to generate information (speaker information) regarding a speech when the speech of the participant is detected, and transmit the information to the conference room terminal 10. When the speech of the participant is detected, the speaker information transmission unit 206 transmits speaker information including at least speech content by the participant to the conference room terminal 10 (a terminal other than the conference room terminal 10 used by the speaker).

Figure 19:
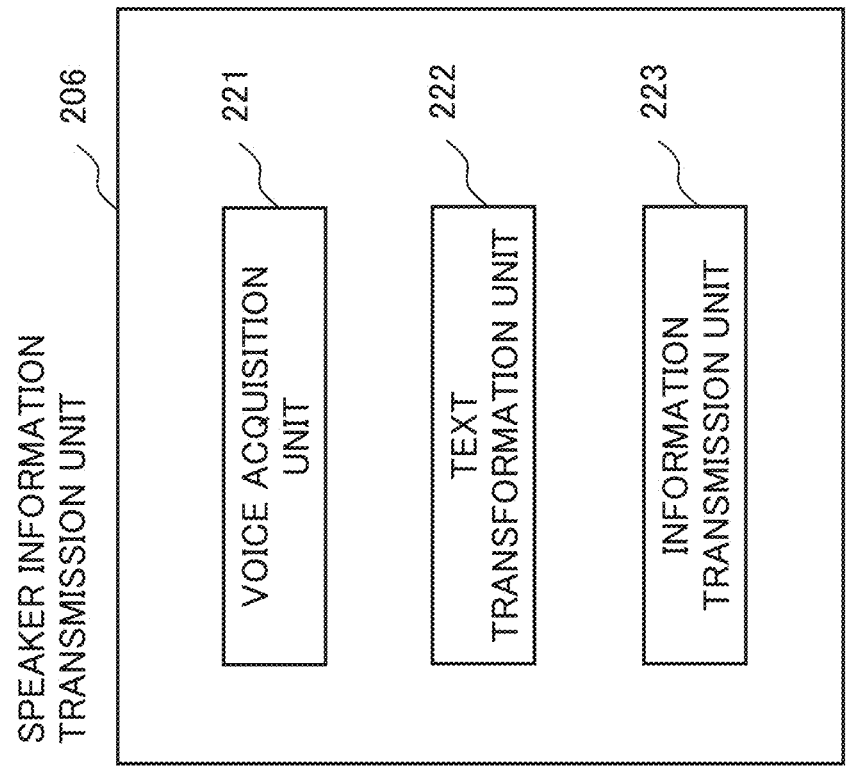
FIG. 19 is a diagram illustrating an example of a processing configuration of a speaker information transmission unit according to the third example embodiment.

The speaker information transmission unit 206 includes a plurality of submodules. FIG. 19 is a diagram illustrating an example of a processing configuration of the speaker information transmission unit 206. Referring to FIG. 19, the speaker information transmission unit 206 includes a voice acquisition unit 221, a text transformation unit 222, and an information transmission unit 223.

The voice acquisition unit 221 is means configured to acquire a voice of a participant from the conference room terminal 10. The conference room terminal 10 generates a voice file of each speech of the participant and transmits the voice file to the server device 20 along with an ID of the own device (a conference room terminal ID). The voice acquisition unit 221 identifies a participant ID relevant to the acquired conference room terminal ID with reference to the participant list. The voice acquisition unit 221 delivers the identified participant ID and the voice file acquired from the conference room terminal 10 to the text transformation unit 222.

The text transformation unit 222 is means configured to transform the acquired voice file into text. The text transformation unit 222 transforms content recorded in a voice file into text using a voice recognition technology. Since the text transformation unit 222 can use an existing voice recognition technology, detailed description thereof is omitted. The text transformation unit 222 operates as follows.

The text transformation unit 222 performs filtering process of removing noise or the like from the voice file. Next, the text transformation unit 222 identifies a phoneme from a sound wave of the voice file. The phoneme is the smallest unit of a language. The text transformation unit 222 identifies a sequence of phonemes and transforms the sequence into a word. The text transformation unit 222 generates a sentence from a sequence of words and outputs a text file. In the filtering process, a voice smaller than a predetermined level is deleted. Therefore, even when a voice of the neighbor is contained in the voice file, the text file is not generated from the voice of the neighbor.

The text transformation unit 222 delivers the participant ID and the text file to the information transmission unit 223.

The information transmission unit 223 is means configured to transmit speaker information to the conference room terminal 10. The information transmission unit 223 acquires a name, a face image, and the like relevant to the participant ID acquired from the text transformation unit 222 with reference to the user database.

The information transmission unit 223 generates "speaker information" including the name of the speaker, the face image of the speaker, and the speech content (a text file of the speech content) and transmits the generated speaker information to the conference room terminal 10. At that time, the information transmission unit 223 includes an ID for identifying speaker information (hereinafter referred to as a speech ID) in the speaker information. For example, the information transmission unit 223 transmits the speaker information illustrated in FIG. 20 to each conference room terminal 10. Any value can be used as the speech ID as long as the value is information with the speech can be uniquely identified. For example, the information transmission unit 223 can generate the speech ID by increasing the value of the speech ID whenever the speaker information is generated.

In addition, the information transmission unit 223 delivers the participant ID, the speech ID, and the speech content (the text file) of the speaker to the participant's opinion management unit 207.

The participant's opinion management unit 207 is means configured to manage information (participant's view information) indicating an opinion of a participant about a speech of another person. More specifically, the participant's opinion management unit 207 manages a database storing each participant's view about the speech of another person (hereinafter referred to as a participant's view database).

To generate and manage the participant's view database, the participant's opinion management unit 207 generates a conference record on the basis of the participant ID, the speech ID, and the speech content acquired from the information transmission unit 223. Specifically, the participant's opinion management unit 207 stores a speech time, the participant ID, the speech ID, and the speech content in association with each other. As a result, a conference record as illustrated in FIG. 21 is generated. In FIG. 21, the participant ID of the speaker is referred to as a "speaker ID."

The participant's opinion management unit 207 acquires "participant's view information" from each conference room terminal 10. The participant's opinion management unit 207 reflects the obtained participant's view information in the conference record. For example, when a participant's opinion is "agreement," the participant's opinion management unit 207 adds the agreement of the participant about the speech of another person to the conference record.

The participant's opinion management unit 207 identifies a speech of which the participant has expressed an opinion on the basis of the speech ID (a speech ID included in the participant's view information from among speeches included in the conference record). The participant's opinion management unit 207 generates, for example, table information (participant's view database) illustrated in FIG. 22 by reflecting participant's opinions in the identified speech. The participant's view database is a database that manages the speech content by the participants and views of other participants in association. In FIG. 22, when each participant expresses an opinion of "agreement" about the speech, a flag is set ("1" is set).

At the time of a response to the profile provision request acquired from the conference room terminal 10, the profile information provision unit 204 includes statistical information regarding an opinion (view) of another person about the speech of the participant who has transmitted the information request. Specifically, the profile information provision unit 204 generates "participant's opinion statistical information" with reference to the participant's view database. As described above, the participant's opinion statistical information is statistical information regarding an opinion of a participant about a speech of another person.

For example, the profile information provision unit 204 generates, as participant's opinion statistical information, a ratio (an agreement ratio) of speeches that each participant agrees with speeches of others in the entire conference. That is, the profile information provision unit 204 calculates, as the agreement ratio, a ratio of speeches with which other participants agree among speeches by the participants.

The profile information provision unit 204 calculates a total number of speeches of one participant (a participant manipulating the conference room terminal 10 which is a transmission source of a profile information provision request) with reference to the participant's view database. Specifically, the profile information provision unit 204 calculates a total number of speaker IDs (participant IDs) relevant to the one participant among entries of the participant's view database. Further, the profile information provision unit 204 counts the number of entries in which a flag is set among the entries of the speaker ID relevant to the one participant with respect to the participants other than the one participant. The profile information provision unit 204 calculates an agreement ratio of each participant by calculating the ratio of the entry in which the flag is set to the calculated total number of entries.

In the example of FIG. 22, agreement ratios of other participants to a speech of the participant with speaker ID01 are participant ID02=50%, participant ID03=100%, and participant ID04=0%. The result indicates that an opinion of participant ID03 is affirmative (positive) and an opinion of participant ID04 is oppose (negative) with respect to a speech of the participant ID01 of the participant.

The profile information provision unit 204 includes the generated participant's opinion statistical information in a response to the profile provision request and transmits the response to the conference room terminal 10 which is a transmission source of the request.

Note that the profile information provision unit 204 may generate another index as the participant's opinion statistical information instead of the agreement ratio. For example, a "disagreement ratio" to speeches of other people may be generated as participant's opinion statistical information.

Figure 23:
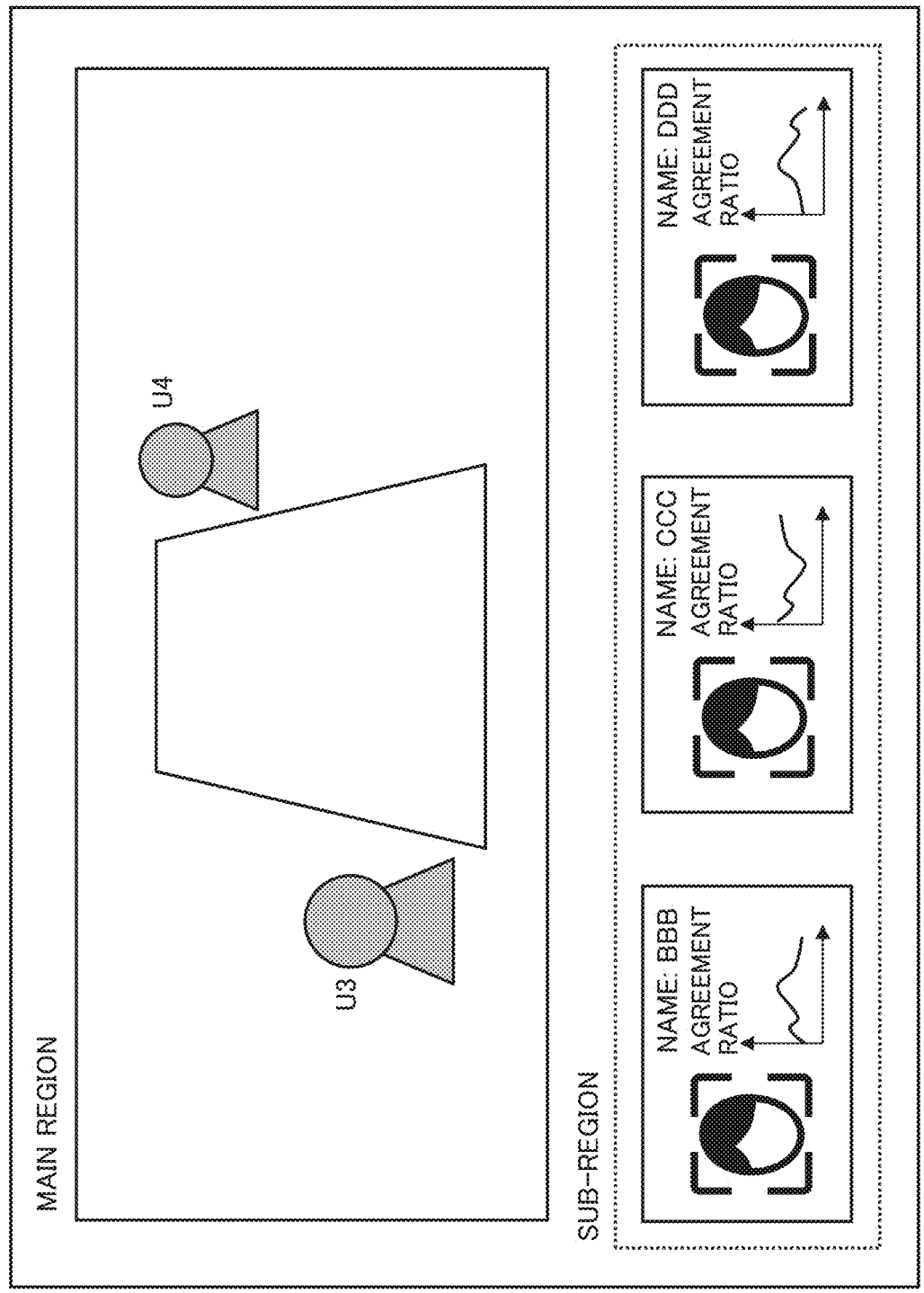
FIG. 23 is a diagram illustrating an operation of the conference room terminal according to the third example embodiment.

Alternatively, the profile information provision unit 204 may generate the "agreement ratio" or the "disagreement ratio" for each time zone as participant's opinion statistical information. For example, the profile information provision unit 204 may calculate an agreement ratio for each predetermined period (for example, every 10 minutes) and transmit the agreement ratio as participant's opinion statistical information to the conference room terminal 10. In this case, the conference room terminal 10 may display a temporal change of an agreement ratio or the like (see FIG. 23).

Alternatively, the profile information provision unit 204 may generate participant's opinion statistical information of a base different from that of the participant of the information provision request. The profile information provision unit 204 identifies a transmission source of the profile information provision from the conference room terminal ID. The profile information provision unit 204 identifies a participant ID of the base different from that of the identified conference room terminal ID with reference to the participant list. The profile information provision unit 204 calculates an agreement ratio to the identified participant ID of the other base with reference to the participant's view database. For example, the profile information provision unit 204 calculates the agreement ratio for each participant ID of the other base and calculates an average value of the calculated agreement ratios to calculate the agreement ratio on the other base.

Figure 24:
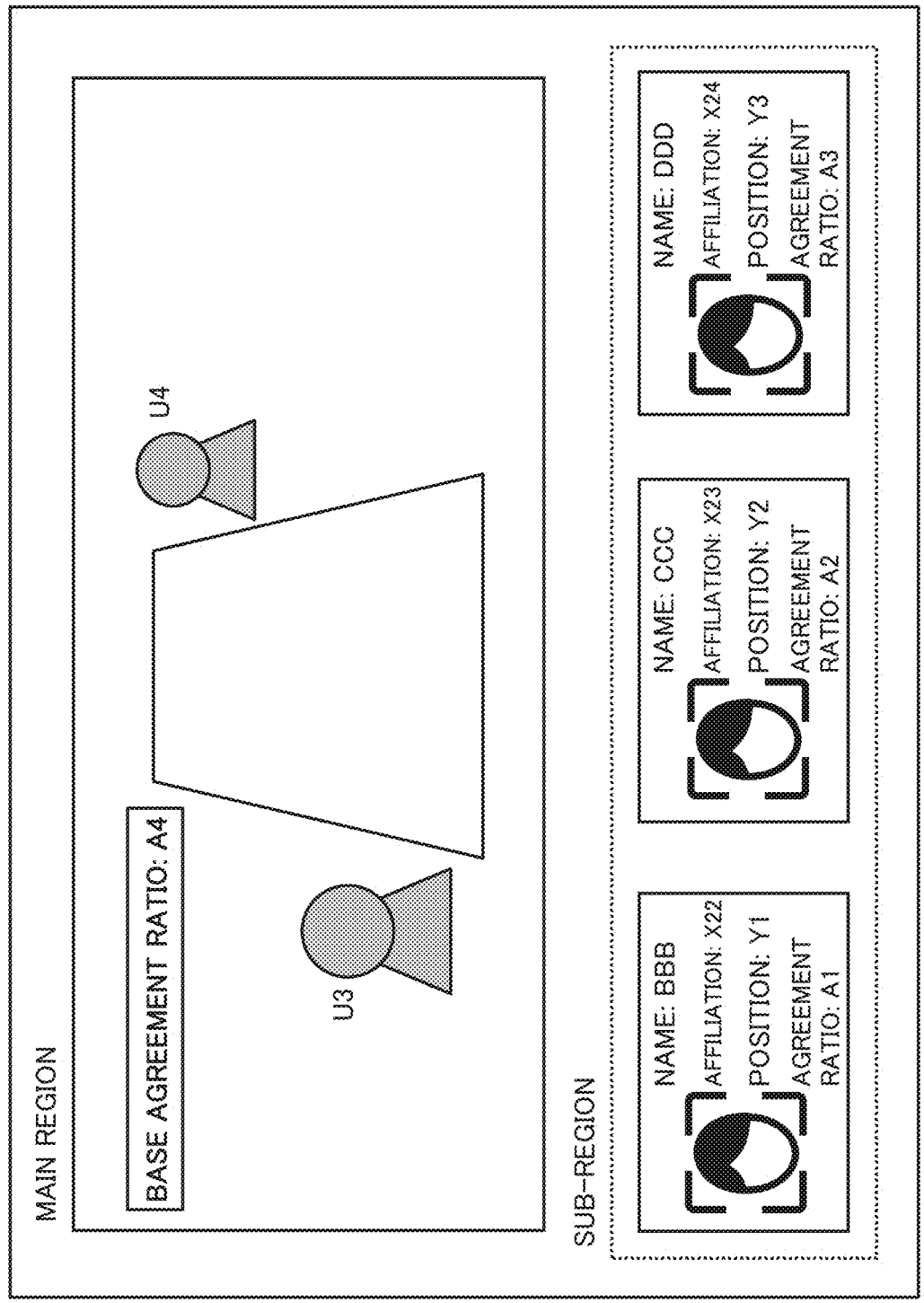
FIG. 24 is a diagram illustrating an operation of the conference room terminal according to the third example embodiment.

For example, in the example of FIG. 2, when the participant U1 (the conference room terminal 10-1 manipulated by the participant U1) transmits the profile information provision request, the profile information provision unit 204 generates participant's opinion statistical information of the entire base B. For example, in the example of FIG. 22, the participant IDs (speaker IDs) of the participants U1 and U2 in the base A are ID01 and ID02, respectively. In addition, participant IDs (speaker IDs) of participants U3 and U4 in the base B are ID03 and ID04, respectively. The agreement ratio of the base B to the speeches of the participant U1 of the base A is calculated as 50% (2/4). In this case, the conference room terminal 10 may display an agreement ratio of the entire base of the partner side (a base agreement ratio) in a main region in which a bird's eye view of the base of the partner side is displayed (see FIG. 24). For the base agreement ratio, an agreement ratio for each time zone may be calculated.

[Operation of Conference Assistance System]

Next, an operation of the conference assistance system according to the third example embodiment will be described.

Figure 25:
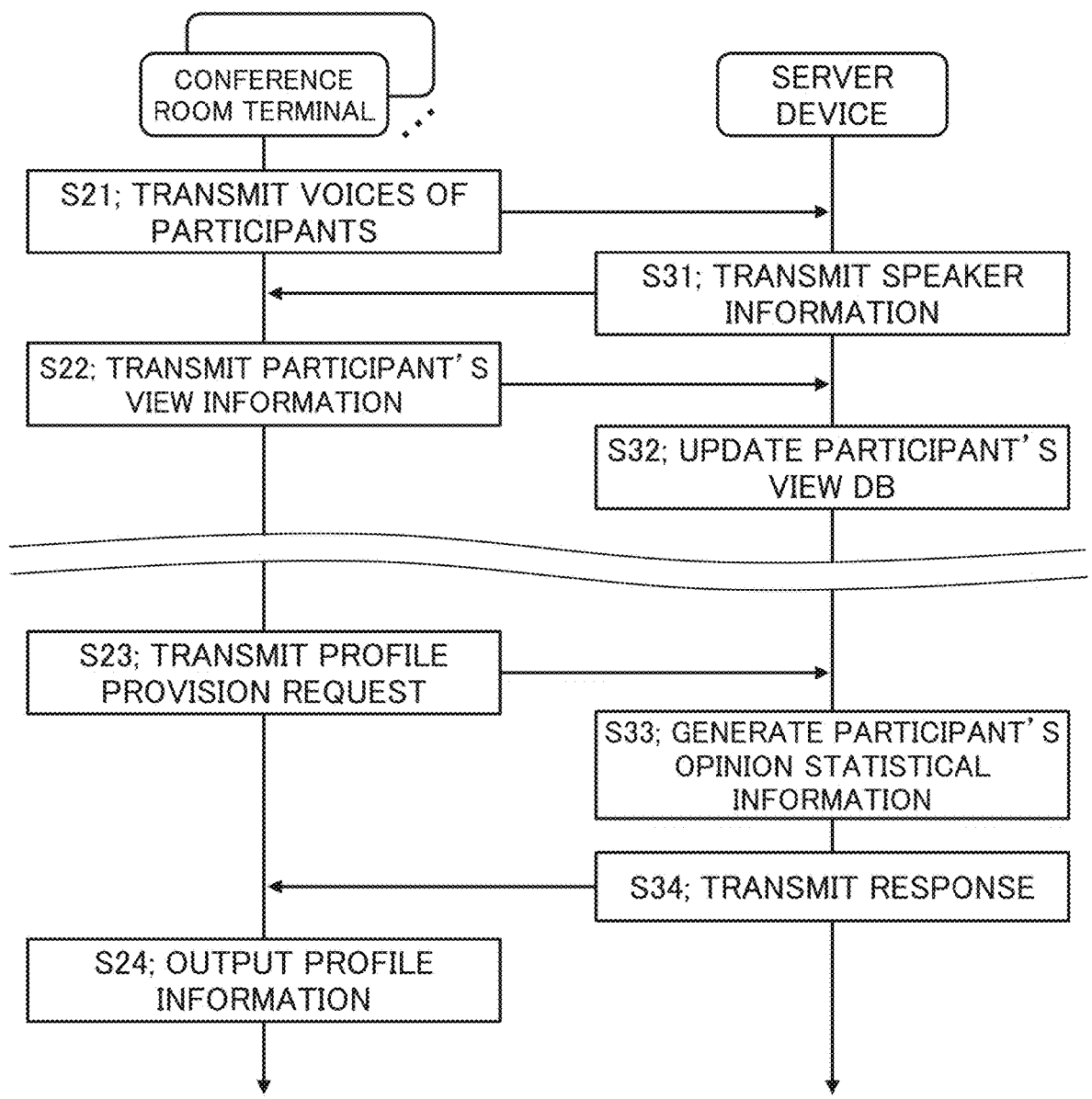
FIG. 25 is a sequence diagram illustrating an example of an operation of a conference assistance system according to the third example embodiment.

FIG. 25 is a sequence diagram illustrating an example of the operation of the conference assistance system according to the third example embodiment. FIG. 25 is a sequence diagram illustrating an example of a system operation when a conference is actually held and mainly illustrates differences from the first example embodiment.

When the participant makes a speech during the conference, the conference room terminal 10 transmits voices of the participants to the server device 20 (step S21).

The server device 20 acquires the voices and generates "speaker information" including the speech content. The server device 20 transmits the generated speaker information to the conference room terminal 10 (step S31).

The conference room terminal 10 displays a screen for inputting an opinion of a participant (a view of a participant about the speech) using the acquired speaker information. Specifically, the conference room terminal 10 provides the participant with an interface as illustrated in FIG. 15. The conference room terminal 10 acquires views of the participants on the interface and transmits "participant's view information" including the content (for example, agreement, disagreement, neutrality, or the like) to the server device 20 (step S22).

The server device 20 updates the participant's view database using the acquired participation view information (step S32).

During the conference, the operations of steps S21 to S32 are repeated, and the views of the participants are collected in the participant's view database.

During the conference, the conference room terminal 10 transmits a profile provision request to the server device 20 (step S23).

The server device 20 generates the participant's opinion statistical information at a timing at which the profile provision request is received (step S33).

The server device 20 transmits a response (a response to the profile provision information) including the generated participant's opinion statistical information to the conference room terminal 10 (step S34).

The conference room terminal 10 outputs the participant profile information based on the acquired response (step S24).

As described above, the server device according to the third example embodiment collects the opinions expressed by the participants of the conference about the speeches of other participants and provides the participants with information regarding the opinions of other people when there are requests from by the participants. As a result, even in a video conference or the like in which it is difficult to ascertain an expression change of the other people, the participants can know the thinking of the other participants by confirming the "agreement ratio" or the like displayed on the conference room terminal 10.

Figure 26:
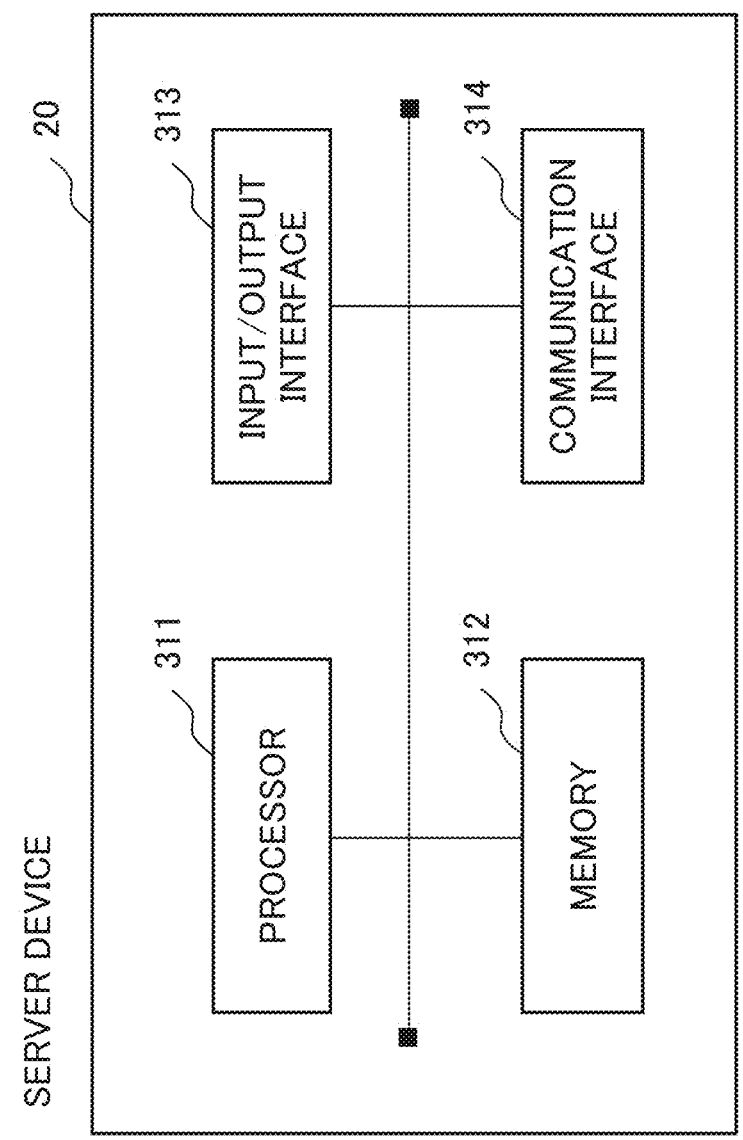
FIG. 26 is a diagram illustrating an example of a hardware configuration of a server device.

Next, hardware of each device included in the conference assistance system will be described. FIG. 26 is a diagram illustrating an example of a hardware configuration of the server device 20.

The server device 20 can be configured with an information processing device (a so-called computer) and has the configuration illustrated in FIG. 26. For example, the server device 20 includes a processor 311, a memory 312, an input/output interface 313, and a communication interface 314. The constituent elements such as the processor 311 are connected via an internal bus or the like to be able to communicate with each other.

However, the configuration illustrated in FIG. 26 is not intended to limit the hardware configuration of the server device 20. The server device 20 may include hardware (not illustrated) or may not include the input/output interface 313 as necessary. The number of processors 311 and the like included in the server device 20 is not limited to the example of FIG. 26. For example, the plurality of processors 311 may be included in the server device 20.

The processor 311 is, for example, a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 executes various programs including an operating system (OS).

The memory 312 is a random access memory (RAM), a read-only memory (ROM), a hard disk drive (HDD), a solid state drive (SSD), or the like. The memory 312 stores an OS program, an application program, and various kinds of data.

The input/output interface 313 is an interface of a display device or an input device (not illustrated). The display device is, for example, a liquid crystal display or the like. The input device is, for example, a device such as a keyboard or a mouse that receives a user manipulation.

The communication interface 314 is a circuit, a module, or the like that communicates with other devices. For example, the communication interface 314 includes a network interface card (NIC).

Functions of the server device 20 are enabled by various processing modules. The processing modules are enabled, for example, by the processor 311 executing programs stored in the memory 312. The programs can be recorded on a computer-readable recording medium. The recording medium may be a non-transitory medium such as a semiconductor memory, a hard disk, a magnetic recording medium, or an optical recording medium. That is, the present invention can also be enabled as a computer program product. The program can be downloaded via a network or updated using a recording medium that stores the program. Further, the processing modules may be enabled by a semiconductor chip.

The conference room terminal 10 can also be configured with an information processing device similarly to the server device 20. Since there is no difference in the basic hardware configuration from the server device 20, description thereof will be omitted. The conference room terminal 10 may include a camera and a microphone, or may be connectable with a camera and a microphone.

The server device 20 is equipped with a computer and the functions of the server device 20 are enabled by causing the computer to execute programs. The server device 20 executes a conference assistance method in accordance with the program.

Modified Examples

The configurations, the operations, and the like of the conference assistance system described in the above example embodiment are merely exemplary and are not intended to limit the configuration and the like of the system.

In the above example embodiment, a microphone is connected to the conference room terminal 10 and a speaker is identified with an ID of the conference room terminal 10 that transmits a voice. However, one microphone may be installed at a desk in each base and the microphone may collect a speech of each participant. In this case, the server device 20 may perform "speaker identification" on the voice collected from the microphone to identify the speaker.

In the above example embodiment, the case in which the dedicated conference room terminal 10 is installed on the desk has been described, but the function of the conference room terminal 10 may be enabled by a terminal held (possessed) by the participant. For example, each of the participants may participate in the conference using their own terminals. The participant operates the own terminal and transmits the own face image to the server device 20 when a conference starts. The terminal transmits the voice of the participant to the server device 20. The server device 20 may provide an image, a video, or the like to the participant using a projector.

The profile of the system user (an attribute value of the user) may be input using a scanner or the like. For example, the user inputs an image related to the own business card to the server device 20 using a scanner. The server device 20 performs optical character recognition (OCR) processing on the acquired images. The server device 20 may determine the profile of the user based on the obtained information.

In the above example embodiment, the case in which biometric information related to a "face image" is transmitted from the conference room terminal 10 to the server device 20 has been described. However, the biometric information related to "a feature amount generated from the face image" may be transmitted from the conference room terminal 10 to the server device 20. The server device 20 may perform a process of comparing a feature amount registered in the user database with an acquired feature amount (a feature vector).

In the above example embodiment, when a request (a profile information provision request) is received from the conference room terminal 10, the server device 20 transmits profile information of other participants to the conference room terminal 10. However, the server device 20 may transmit profile information of other participants to each of the conference room terminals 10 at the beginning of the conference. For example, the server device 20 may transmit the profile information of each participant to the conference room terminal 10 at a timing at which the identification of all the participants in the conference ends (a timing at which generation of a participant list ends).

When the server device 20 retains layout information (map information) of each base, positional information of a person who is seated may be transmitted to the conference room terminal 10 using the layout information. For example, when the server device 20 retains layout information of two bases illustrated in FIG. 2, the positional information of the participants is identified with a conference room terminal ID. The server device 20 transmits the layout information including two bases and positional information of the participants U1 to U4 to the conference room terminal 10. The conference room terminal 10 acquiring the positional information generates an interface, as illustrated in FIG. 27. The conference room terminal 10 may display profile information of a person designated by the interface illustrated in FIG. 27.

In the above example embodiment, the case in which the conference room terminal 10 displays the profile information or the like when the profile information of the other participant is acquired has been described. The conference room terminal 10 may use the acquired profile information for other purposes. For example, the conference room terminal 10 may group the other participants on the basis of an agreement ratio acquired from the server device 20. For example, the conference room terminal 10 may display the participants separately in a group with a high agreement ratio and a group having a low agreement ratio. Alternatively, the conference room terminal 10 may generate a relationship map between the participants using the foregoing grouping.

The server device 20 may transmit the number of times each participant speaks to the conference room terminal 10. The conference room terminal 10 may visualize an amount of speech. Alternatively, the conference room terminal 10 may perform a display or the like of encouraging the participants to speak more actively to a participant whose speech amount is less than a predetermined threshold value.

The server device 20 may notify the conference room terminal 10 of a voice volume (magnitude of voice) of each participant. The conference room terminal 10 performs various kinds of control according to the notified voice volume. For example, the conference room terminal 10 performs a display for encouraging a participant with a small voice to raise her or his volume. Alternatively, the conference room terminal 10 takes measures such as an increase in an amplification factor (gain) of a microphone that collects a voice of a person with a small voice.

The server device 20 may analyze a speech of each participant, automatically extract points at issue of the conference, and transmit the extracted points at issue to the conference room terminal 10. For example, the server device 20 sets keywords (predetermined keywords) that frequently appear in speeches of each participant as points at issue of the conference and transmits the keywords to the conference room terminal 10. The conference room terminal 10 may display the points at issue, provide an interface acquiring an intention (the pros and cons of the points at issue) of the participant and acquire a view of the participant. The server device 20 may collect (aggregate) the views of the respective participants and provide the aggregation result to the conference room terminal 10. The aggregation result may be displayed on the conference room terminal 10.

In the flow diagram (a flowchart and a sequence diagram) used in the above description, the plurality of steps (processes) has been described in order, but the execution order of the steps executed in the example embodiment is not limited to the described order. In the example embodiment, for example, the order of the illustrated steps can be changed within a range in which there is no problem in terms of content, such as executing the processes in parallel.

To facilitate understanding of the present disclosure, the above example embodiments have been described in detail and it is not intended that all the above-described configurations are necessary. When a plurality of example embodiments has been described, each example embodiment may be used alone or in combination. For example, a part of a configuration of an example embodiment can be replaced with a configuration of another example embodiment or a configuration of another example embodiment can be added to a configuration of an example embodiment. Further, other configurations can be added, deleted, and replaced in a part of a configuration of an example embodiment.

Although the industrial applicability of the present invention is apparent from the above description, the present invention can be appropriately applied to a system or the like that assists with a conference or the like held by a company or the like.

The whole or part of the example embodiments disclosed above can be described as, but not limited to, the following supplementary notes.

[Supplementary Note 1]
 A server device comprising:
  an acquisition unit configured to acquire a profile of each of a plurality of users using a conference assistance system; and
  an information provision unit configured to provide a first participant participating in a conference among the plurality of users with a profile related to a second participant participating in the same conference as the conference in which the first participant participates.

[Supplementary Note 2]
 The server device according to supplementary note 1,
  in which the acquisition unit acquires a face image and a profile of each of the plurality of users, and
  the information provision unit provides the first participant with a face image and a profile of the second participant.

Supplementary Note 3:
 The server device according to supplementary note 2, in which the acquisition unit generates a user ID for identifying each of the plurality of users, the server device further comprises a user database configured to store the generated user IDs, face images, and profiles in association with each other, and the information provision unit acquires the face image and the profile of the second participant from the user database using a user ID of the second participant.

[Supplementary Note 4]

The server device according to supplementary note 3, further comprising a participant identification unit that identifies the first and second participants among the plurality of users through a comparison process using the face images acquired from the first and second participants and the face images registered in the user database.

[Supplementary Note 5]

A conference assistance system comprising:
  a first terminal used by a first participant participating in a conference;
  a second terminal used by a second participant participating in the same conference as the conference in which the first participant participates; and
  a server device,
  in which the server device includes
  an acquisition unit that acquires a profile of each of a plurality of users who uses the system, and
  an information provision unit that provides a profile related to the second participant to the first terminal.

[Supplementary Note 6]

The conference assistance system according to supplementary note 5,
  in which the acquisition unit acquires a face image and the profile of each of the plurality of users, and
  the information provision unit provides a face image and a profile of the second participant to the first terminal.

Supplementary Note 7:

The conference assistance system according to supplementary note 6, in which the acquisition unit generates a user ID for identifying each of the plurality of users, the server device further includes a user database that stores the generated user ID, face image, and profile in association with each other, and the information provision unit acquires the face image and the profile of the second participant from the user database by using a user ID of the second participant.

[Supplementary Note 8]

The conference assistance system according to supplementary note 7,
  in which the server device further includes
  a participant identification unit that identifies the first and second participants among the plurality of users through a comparison process using the face images acquired from the first and second participants and the face images registered in the user database.

[Supplementary Note 9]

The conference assistance system according to any one of supplementary notes 5 to 8, in which the first terminal requests the server device to provide information regarding the profile related to the second participant.

[Supplementary Note 10]

The conference assistance system according to supplementary note 9, in which the first terminal acquires a response to the request for information provision of the profile from the server device and displays the profile related to the second participant based on the acquired response.

Supplementary Note 11:

The conference assistance system according to supplementary note 10, in which the server device further includes: a speaker information transmission unit that transmits, to the second terminal, speaker information including at least content of a speech by the first participant when the speech of the first participant is detected, the second terminal transmits view information including a view of the second participant on the content of the speech by the first participant to the server device, the server device further includes a participant's view database that manages the content of the speech by the first participant and a view of the second participant in association with each other, and the information provision unit transmits a response including statistical information regarding the view of the second participant to the first terminal when a request to provide information regarding the profile is acquired from the first terminal.

[Supplementary Note 12]

The conference assistance system according to supplementary note 11, in which the information provision unit calculates a ratio of speech with which the second participant agrees among speech by the first participant as an agreement ratio and transmits a response including the calculated agreement ratio to the first terminal.

[Supplementary Note 13]

The conference assistance system according to supplementary note 11 or 12, in which the second terminal transmits agreement or disagreement of the second participant about the content of the speeches of the first participant as the view information to the server device.

[Supplementary Note 14]

A conference assistance method comprising: in a server device, acquiring a profile of each of a plurality of users using a conference assistance system; and
  providing a first participant participating in a conference among the plurality of users with a profile related to a second participant participating in the same conference as the conference in which the first participant participates.

[Supplementary Note 15]

A computer-readable recording medium that stores a program causing a computer mounted on a server device to execute:
  a process of acquiring a profile of each of a plurality of users using a conference assistance system; and
  a process of providing a first participant participating in a conference among the plurality of users with a profile related to a second participant participating in the same conference as the conference in which the first participant participates.

The disclosures of the cited literatures are incorporated herein by reference. Although the exemplary embodiments of the present invention have been described above, the present invention is not limited to the exemplary embodiments. It will be understood by those of ordinary skill in the art that these embodiments are exemplary and that various modifications are possible without departing from the scope and spirit of the present invention. That is, it goes without saying that the present invention includes various modifications and corrections that can be made by those of ordinary skill in the art in accordance with the entire disclosure including the claims and the technical idea.

REFERENCE SIGNS LIST 10, 10-1 to 10-8 Conference room terminal
20, 100 Server device
101 Acquisition unit
102 Information provision unit
201, 301 Communication control unit
202 User registration unit
203 Participant identification unit
204 Profile information provision unit
205, 306 Storage unit
206 Speaker information transmission unit
207 Participant's opinion management unit
211 User information acquisition unit 212 ID generation unit
213 Feature amount generation unit
214 Entry management unit
221 Voice acquisition unit
222 Text transformation unit
223 Information transmission unit
302 Face image acquisition unit
303 Voice transmission unit
304 Profile information request unit
305 Profile information output unit
307 Opinion acquisition unit
311 Processor
312 Memory
313 Input/output interface
314 Communication interface

What is claimed is:

1. A server device comprising:
one or more memories storing instructions; and
one or more processors configured to execute the instructions to:
generate a user ID for identifying each of a plurality of users using a conference assistance system;
acquire a first profile of a first participant participating in a conference in which a plurality of attribute values are set for at least one item among a plurality of items included in the first profile of each of the plurality of users from a user database that stores the generated user IDs, face images, and profiles in association with each other;
select an attribute value from the plurality of attribute values for the item in the first profile for which the plurality of attribute values are set, according to a purpose of the conference;
generate a second profile of the first participant including the selected attribute value; and
provide a second participant participating in the conference with the second profile of the first participant including the selected attribute value, wherein the first participant participates in the same conference as the second participant.

2. The server device according to claim 1,
wherein the one or more processors are configured to execute the instructions to:
acquire a face image and a profile of each of the plurality of users, and
provide the second participant with a face image and a profile of the first participant.

3. The server device according to claim 1, wherein the one or more processors are configured to execute the instructions to identify the first and second participants among the plurality of users through a comparison process using the face images acquired from the first and second participants and the face images registered in the user database.

4. A conference assistance system comprising:
a first terminal used by a first participant participating in a conference;
a second terminal used by a second participant participating in the same conference as the conference in which the first participant participates;
and a server device,
wherein the server device includes one or more memories storing instructions, and one or more processors configured to execute the instructions to:
generate a user ID for identifying each of a plurality of users using a conference assistance system;
acquire a first profile of the second participant participating in a conference in which a plurality of attribute values are set for at least one item among a plurality of items included in the first profile of each of the plurality of users, from a user database that stores the generated user IDs, face images, and profiles in association with each other;
select an attribute value from the plurality of attribute values for the item in the first profile for which the plurality of attribute values are set, according to a purpose of the conference
generate a second profile of the second participant including the selected attribute value, and
provide the second profile of the second participant to the first terminal.

5. The conference assistance system according to claim 4, wherein the one or more processors are configured to execute the instructions to: acquire a face image and the profile of each of the plurality of users, and provide a face image and a profile of the second participant to the first terminal.

6. The conference assistance system according to claim 4,
wherein the one or more processors are configured to execute the instructions to identify the first and second participants among the plurality of users through a comparison process using the face images acquired from the first and second participants and the face images registered in the user database.

7. The conference assistance system according to claim 4, wherein the first terminal requests the server device to provide information regarding the profile related to the second participant.

8. The conference assistance system according to claim 7, wherein the first terminal acquires a response to the request for information provision of the profile from the server device and displays the profile related to the second participant based on the acquired response.

9. A conference assistance system comprising:
a first terminal used by a first participant participating in a conference;
a second terminal used by a second participant participating in the same conference as the conference in which the first participant participates; and
a server device, wherein the server device includes one or more memories storing instructions; and one or more processors configured to execute the instructions to:
acquire a profile of each of a plurality of users who uses the system, and
provide a profile related to the second participant to the first terminal,
wherein the first terminal requests the server device to provide information regarding the profile related to the second participant and acquires a response to the request for information provision of the profile from the server device and displays the profile related to the second participant based on the acquired response,
wherein the one or more processors are configured to execute the instructions to transmit, to the second terminal, speaker information including at least content of a speech by the first participant when the speech of the first participant is detected,
the second terminal transmits view information including a view of the second participant on the content of the speech by the first participant to the server device, the server device further includes a participant's view database that manages the content of the speech by the first participant and a view of the second participant in association with each other, and the one or more processors are configured to execute the instructions to transmit a response including statistical information regarding the view of the second participant to the first terminal when a request to provide information regarding the profile is acquired from the first terminal.

10. The conference assistance system according to claim 9, wherein the one or more processors are configured to execute the instructions to calculate a ratio of speech with which the second participant agrees among speech by the first participant as an agreement ratio and transmit a response including the calculated agreement ratio to the first terminal.

11. The conference assistance system according to claim 9, wherein the second terminal transmits agreement or disagreement of the second participant about the content of the speeches of the first participant as the view information to the server device.

12. A conference assistance method comprising: in a server device, generating a user ID for identifying each of a plurality of users using a conference assistance system;

acquiring a first profile of a first participant participating in a conference in which a plurality of attribute values are set for at least one item among a plurality of items included in the first profile of each of the plurality of users from a user database that stores the generated user IDs, face images, and profiles in association with each other;

selecting an attribute value from the plurality of attribute values for the item in the first profile for which the plurality of attribute values are set, according to a purpose of the conference;

generating a second profile of the first participant including the selected attribute value; and providing a second participant participating in the conference with the second profile of the first participant including the selected attribute value, wherein the first participant participates in the same conference as the second participant.

* * * * *